(12) United States Patent
Oh et al.

(10) Patent No.: US 11,269,321 B2
(45) Date of Patent: Mar. 8, 2022

(54) EQUIPMENT DIAGNOSIS SYSTEM AND METHOD BASED ON DEEP LEARNING

(71) Applicant: SAMSUNG ELECTRONICS CO., LTD., Suwon-si (KR)

(72) Inventors: Kyoung-whan Oh, Hwaseong-si (KR); Ho-youl Lee, Yongin-si (KR); Won-ki Park, Seoul (KR); Jong-hwi Seo, Suwon-si (KR); Young-il Jang, Yongin-si (KR); Ha-nock Kwak, Seongnam-si (KR); Byoung-tak Zhang, Seoul (KR); Seong-ho Choi, Seoul (KR)

(73) Assignees: Samsung Electronics Co., Ltd., Suwon-si (KR); Seoul National University R & DB Foundation, Seoul (KR)

( * ) Notice: Subject to any disclaimer, the term of this patent is extended or adjusted under 35 U.S.C. 154(b) by 323 days.

(21) Appl. No.: 16/291,419

(22) Filed: Mar. 4, 2019

(65) Prior Publication Data
US 2019/0302750 A1    Oct. 3, 2019

(30) Foreign Application Priority Data
Mar. 29, 2018    (KR) .................. 10-2018-0036603

(51) Int. Cl.
G05B 23/02    (2006.01)
G06F 17/14    (2006.01)
G06N 3/04    (2006.01)

(52) U.S. Cl.
CPC ......... *G05B 23/024* (2013.01); *G06F 17/142* (2013.01); *G06N 3/0418* (2013.01)

(58) Field of Classification Search
CPC . G05B 23/024; G05B 23/0221; G06F 17/142; G06N 3/0418; G06N 3/08; G06N 3/0454; G06Q 10/0639; G06Q 10/20
See application file for complete search history.

(56) References Cited

U.S. PATENT DOCUMENTS 5,419,197 A * 5/1995 Ogi .................... G05B 23/0221
                                                          702/141
5,576,632 A * 11/1996 Petsche ............... G01R 31/343
                                                          324/765.01

(Continued)

FOREIGN PATENT DOCUMENTS

KR     10-1137318 B1    4/2012
KR     10-2015-0139212 A    12/2015

OTHER PUBLICATIONS

Lu et al. "Intelligent fault diagnosis of rolling bearing using hierarchical convolutional network based health state classification", Feb. 2017, Elsevier, 139-151.*

(Continued)

*Primary Examiner* — Mohamed Charioui
(74) *Attorney, Agent, or Firm* — Lee IP Law, PC

(57) ABSTRACT

An equipment diagnosis system and method, which use abnormal data and normal data of equipment and accurately and effectively perform diagnosis on the equipment, are provided. The equipment diagnosis system includes a data acquisition unit to acquire time series data of equipment, a preprocessing unit convert the time series data into frequency data including a temporal component through a Fourier transform, a deep learning unit to perform deep learning through a convolution neural network (CNN) by using the frequency data, and a diagnosis unit to determine a state of the equipment to be a normal state or a breakdown state based on the deep learning.

16 Claims, 20 Drawing Sheets

(56) References Cited

U.S. PATENT DOCUMENTS

| | | | |
|---|---|---|---|
| 5,594,175 | A | 1/1997 | Lyon et al. |
| 7,202,794 | B2 | 4/2007 | Huseynov et al. |
| 7,942,824 | B1 | 5/2011 | Kayyali et al. |
| 8,544,087 | B1 * | 9/2013 | Eskin ............... H04L 41/06 726/22 |
| 8,955,383 | B2 | 2/2015 | Huseynov et al. |
| 9,110,461 | B2 | 8/2015 | Morisawa et al. |
| 9,730,632 | B1 | 8/2017 | Kayyali et al. |
| 2005/0222515 | A1 | 10/2005 | Polyshchuk et al. |
| 2014/0000347 | A1 | 1/2014 | Huseynov et al. |
| 2015/0233792 | A1 * | 8/2015 | Gao ............... G01M 99/005 702/35 |
| 2016/0070673 | A1 * | 3/2016 | Wang ............... G06F 17/14 708/403 |
| 2016/0132042 | A1 | 5/2016 | Wu |
| 2016/0163035 | A1 | 6/2016 | Chang et al. |
| 2016/0348906 | A1 | 12/2016 | Mori |
| 2016/0350194 | A1 * | 12/2016 | Mohan ............... G06N 20/00 |
| 2017/0093419 | A1 | 3/2017 | Usui et al. |
| 2017/0177997 | A1 | 6/2017 | Karlinsky et al. |

OTHER PUBLICATIONS

CS231nConvolutional Neural Networks for Visual Recognition; http://cs231n.stanford.edu/slides/2017/cs231n_2017_lectures.

Li, et al. Lecture 5: Convolutional Neural Networks, Apr. 18, 2017; http://cs231n.github.io/convolutional-networks/.

* cited by examiner

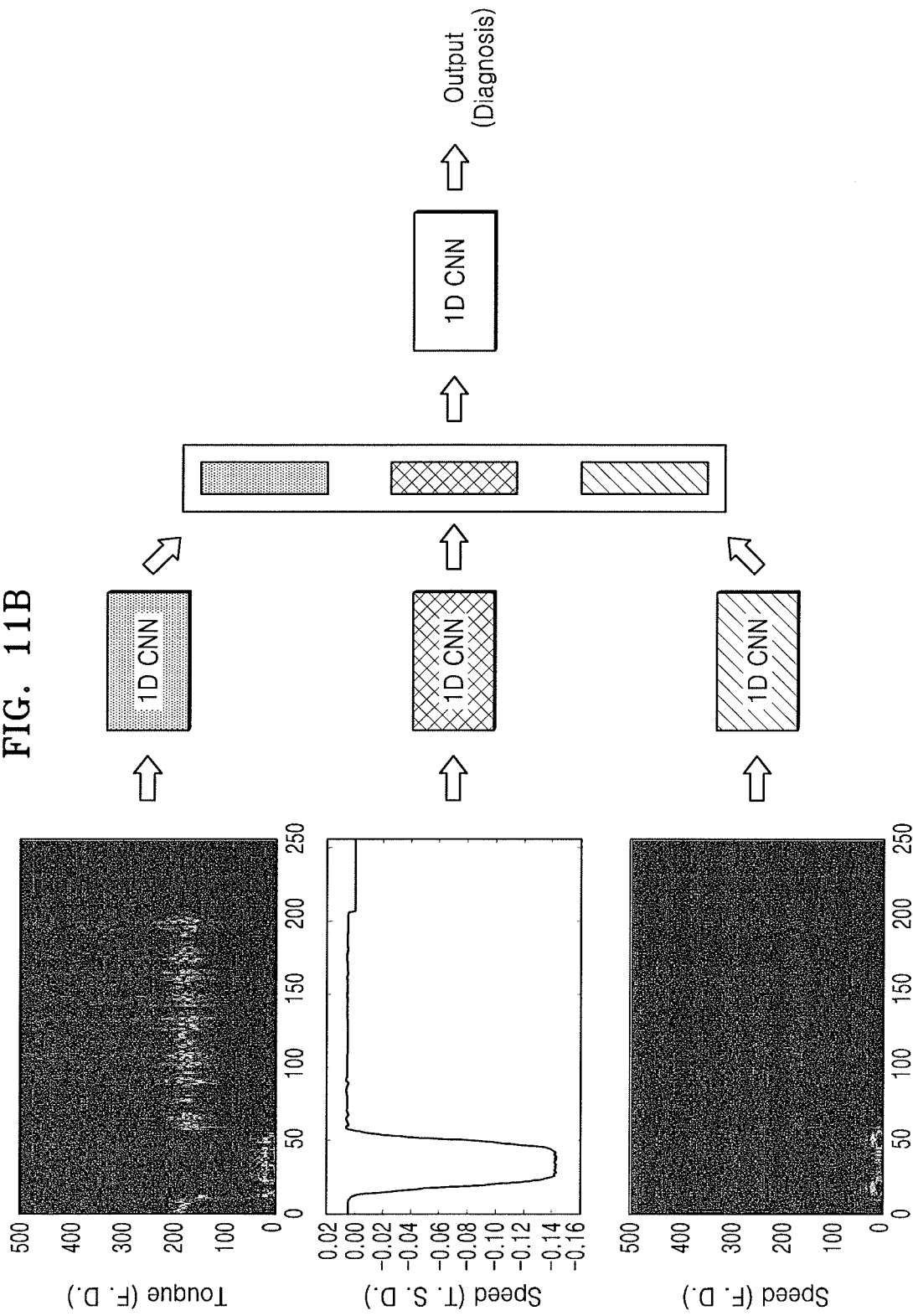

EQUIPMENT DIAGNOSIS SYSTEM AND METHOD BASED ON DEEP LEARNING

CROSS-REFERENCE TO RELATED APPLICATION

Korean Patent Application No. 10-2018-0036603, filed on Mar. 29, 2018, in the Korean Intellectual Property Office, and entitled: "Equipment Diagnosis System and Method Based on Deep Learning," is incorporated by reference herein in its entirety.

BACKGROUND

1. Field

Embodiments relate to equipment diagnosis technology for determining the breakdown or not of equipment, and more particularly, to equipment diagnosis technology for determining the breakdown or not of equipment, based on deep learning.

2. Description of the Related Art

Conventional equipment diagnosis technology acquires data generated in equipment and monitors the deterioration and/or breakdown of a driver using the acquired data to previously check the breakdown or not of a component, supply and demand components, and perform a previous measurement, thereby performing condition-based management (CBM) to minimize a reduction in an equipment operation rate. For example, torque data and speed data acquired from a motor of equipment, internal/external vibration data, temperature data, slope data, atmospheric pressure data, pressure data of the equipment, alarm data, and the like may are obtained through sensors and used to predict equipment breakdown. However, the conventional equipment diagnosis technology has some drawbacks.

SUMMARY

According to one or more embodiments, an equipment diagnosis system including a data acquisition unit to acquire time series data of equipment, a preprocessing unit to perform preprocessing for converting the time series data into frequency data including a time series component through Fourier transform, a deep learning unit to perform deep learning through a convolution neural network (CNN) by using the frequency data, and a diagnosis unit to determine a state of the equipment to be in a normal state or a breakdown state based on the deep learning.

According to one or more embodiments, an equipment diagnosis method including acquiring time series data of equipment, converting the time series data into frequency data including a time series component through a Fourier transform, deep learning deep learning through a CNN using the frequency data, and diagnosing a state of the equipment to be in a normal state or a breakdown state based on deep learning.

According to one or more embodiments, an equipment diagnosis method including acquiring a plurality of kinds of data of equipment, multi-modal deep learning through a CNN by using the plurality of kinds of data, and diagnosing a state of the equipment to be in a normal state or a breakdown state based on multi-modal deep learning.

BRIEF DESCRIPTION OF THE DRAWINGS

Features will become apparent to those of skill in the art by describing in detail exemplary embodiments with reference to the attached drawings in which:

FIG. 11B illustrates a block diagram conceptually of the equipment diagnosis method of FIG. 11A;

DETAILED DESCRIPTION

Figure 1:
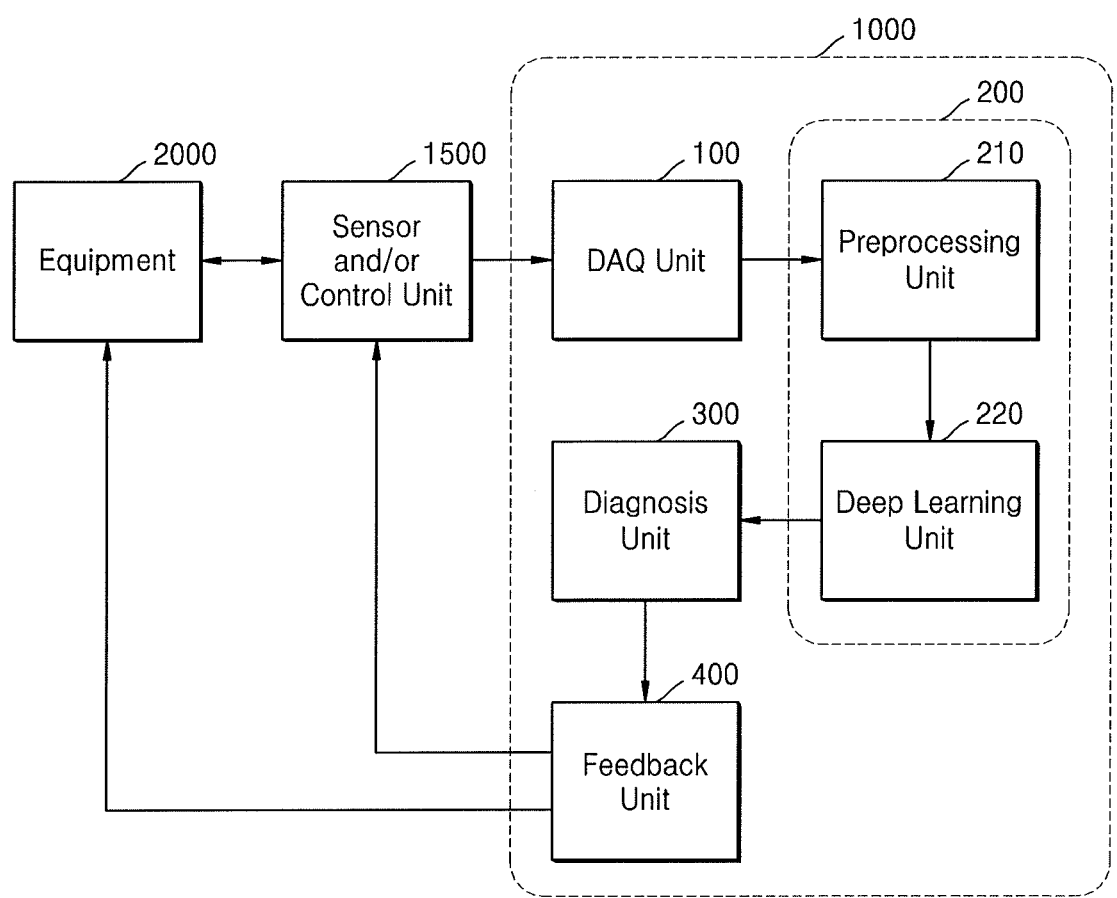
FIG. 1 illustrates a block diagram of an equipment diagnosis system according to an embodiment.

Hereinafter, embodiments will be described in detail with reference to the accompanying drawings. Like reference numerals refer to like elements in the drawings, and their overlapping descriptions are omitted.

As noted above, conventional equipment diagnosis technology has some drawbacks, examples of which are outlined below.

First, time series data is generally obtained from equipment, but it is difficult to directly quantify time series data obtained in a time domain to diagnose equipment. This is because a vibration corresponding to a natural frequency of each component is included in data, based on a structural characteristic of each motor. Therefore, in order to perform quantitative diagnosis on equipment, a domain is changed from time to frequency, and diagnosis is performed. However, a sampling rate increases to accurately measure frequency data in a broad range, increasing an amount of data to be analyzed.

Second, data characteristics of each piece of equipment, each process, each model, and each motor differ. Thus, an individual diagnosis algorithm in which a corresponding data characteristic is reflected is needed for effective diagnosis. However, a lot of time, cost, and effort are expended in building the individual diagnosis algorithm, and the built diagnosis algorithm is applied to only corresponding data. Due to this, the individual diagnosis algorithm has a limitation in terms of utility.

Third, in obtaining data, most data corresponds to a normal state, while data that corresponds to a breakdown state is limited. In equipment diagnosis, only breakdown data is generally used, while discarding most normal data.

FIG. 1 is a block diagram illustrating an equipment diagnosis system 1000 according to an embodiment. Referring to FIG. 1, the equipment diagnosis system 1000 according to an embodiment may include a data acquisition (DAQ) unit 100, a preprocessing/learning computer 200, a diagnosis unit 300, and a feedback unit 400.

The DAQ unit 100 may acquire data from equipment 2000 which is to be diagnosed. Here, the equipment 2000 may be semiconductor equipment used for a semiconductor process. Examples of the semiconductor equipment may include various kinds of equipment and models, based on a plurality of semiconductor processes. For example, a semiconductor post-process may include a package process, a test process, and a module process, tens of kinds of equipment may be provided in each of the processes, and each of the tens of kinds of equipment may be implemented as various models.

The DAQ unit 100 may acquire data (e.g., torque data and speed data of a motor in the equipment; internal/external vibration data, temperature data, atmospheric pressure data; pressure data of the equipment, slope data and current data of the equipment; and so forth) of the various equipment through a sensor and/or control unit 1500. For example, when the equipment 2000 includes a motor, the DAQ unit 100 may receive torque or speed data from a servo driver that controls the motor. The DAQ unit 100 may include a DAQ circuit board, and moreover, may include an analog-to-digital (A/D) converter mounted on the DAQ board.

In the equipment diagnosis system 1000 according to the present embodiment, the sensor and/or control unit 1500, which helps acquire data, may be a separate element independent from the DAQ unit 100 and may not be included in the equipment diagnosis system 1000. However, according to some embodiments, the sensor and/or control unit 1500, which helps acquire data, may be included in the equipment diagnosis system 1000. Also, the sensor and/or control unit 1500 may be includes as an element of the DAQ unit 100. Furthermore, according to some embodiments, the equipment 2000 which is to be diagnosed may be included in the equipment diagnosis system 1000.

Data acquired from the equipment 2000 by the DAQ unit 100 may be time series data. The time series data, data which is acquired at a certain interval over time, may be referred to as a time function and may correspond to data in a time domain. The data of the equipment 2000, acquired by the DAQ unit 100, is not limited to time series data. For example, the data of the equipment 2000 may include text data of the specification of the equipment 2000, and the DAQ unit 100 may acquire non-time series data such as text data.

The preprocessing/learning computer 200 may include a preprocessing unit 210 and a deep learning unit 220. The preprocessing/learning computer 200 may be, e.g., a personal computer (PC), a workstation, a super computer, or the like, for performing a preprocessing process and a deep learning process. Alternatively or additionally, a portable device, e.g., a smartphone may also be used as the preprocessing/learning computer 200. Here, the preprocessing process may be performed by the preprocessing unit 210 executing a program and may perform preprocessing, e.g., a Fourier transform, on the time series data from the DAQ unit 100. Also, the deep learning process may be performed by the deep learning unit 220 executing a program and may perform deep learning on image data from the preprocessing unit 210.

To describe the preprocessing unit 210 and the deep learning unit 220 in more detail, the preprocessing unit 210 may convert the time series data from the DAQ unit 100 into data (i.e., frequency data) in the frequency domain through a Fourier transform. As described above, diagnosing equipment using direct quantification of time series may be problematic. Therefore, the preprocessing unit 210 may convert the time series data into the frequency data through a Fourier transform.

In the equipment diagnosis system 1000 according to the present embodiment, the preprocessing unit 210 may perform preprocessing in order for a time series characteristic or component to be added to the frequency data. For example, the preprocessing unit 210 may convert the time series data into the frequency data (i.e., image data including a frequency and the time series characteristic) including the time series characteristic through a short time Fourier transform (STFT) or a waterfall fast Fourier transform (FFT). The STFT and the waterfall FFT may each include a temporal component, and, thus, may differ from a general FFT. However, the STFT and the waterfall FFT still each perform a FFT, and thus, may be included in an FFT. In particular, the STFT may divide a time series data into segments of equal length and then perform a general FFT on each segment, while the waterfall FFT, which is a special case of the STFT, may perform general FFTs on different segments using a more complex window function. The STFT and the waterfall FFT will be described below in more detail with reference to FIGS. 3A to 3C.

The preprocessing unit 210 may perform preprocessing in order for the time series characteristic to be added to the frequency data, thereby solving a problem where data size increases due to an increase in a sampling rate and removing the need of detailed interval extraction based on image data. For example, in semiconductor equipment, temporal repeatability may be high and, thus, learnability may be high in subsequent deep learning. However, when only a general FFT, only frequency data is obtained, i.e., there is no temporal information, repeatability may be ignored. Since data size increases due to an increase in the sampling rate, a time of deep learning may increase. Also, an extraction of a detailed interval based on image data may be needed to reduce time for deep learning or increasing learnability.

On the other hand, in the equipment diagnosis system 1000 according to the present embodiment, the preprocessing unit 210 may perform sampling on a relatively narrow range when using preprocessing that provides temporal information as well as frequency data, thereby preventing an increase in data size. Also, the preprocessing unit 210 may perform preprocessing based on a desired time interval (for example, an equipment operation time) to generate image data effective for deep learning. Furthermore, the frequency data (i.e., the image data) including the time series characteristic may be generated based on a desired time interval. Thus, extraction of a detailed time interval based on separate image data is not needed.

For reference, in semiconductor equipment, when breakdown occurs, various frequency shifts, which differs from a normal state, may occur. In this case, distinguishing between a breakdown state and a normal state by merely performing an FFT may be difficult. However, when the STFT is performed, since a frequency characteristic may be effectively expressed, it is easy to distinguish a breakdown state from the normal state, and the breakdown or not of equipment may be easily checked. However, there may be equipment of which breakdown is easily checked through the STFT, and there may be equipment of which breakdown is difficult to check. Therefore, a method of more accurately and efficiently determining the breakdown or not of all equipment may be needed.

The deep learning unit 220 may perform deep learning through a convolution neural network (CNN) by using the frequency data (i.e., image data) from the preprocessing unit 210. Here, the CNN may be a deep learning method of extracting and indexing a feature by using the image data, and a basis for accurately and effectively determining the breakdown or not of the equipment 2000 may be provided by performing deep learning through the CNN. For example, a feature of normal data and the breakdown of the equipment 2000 may be checked, and by performing deep learning on a small amount of data (hereinafter referred to as labelled data) where normality and breakdown are checked and which is obtained by indexing a result of the check, labelling of normality and breakdown may be performed on a large amount of data (hereinafter referred to as unlabelled data) where a normal state and a breakdown state are not checked. Such a method may be usefully applied when most data obtained from an actual site are unlabelled data that are difficult to label.

To simply provide description with reference to an equation, it may be assumed that deep learning is performed through a process "x→f(x)→y". Here, x may denote image data corresponding to a state of the equipment 2000, f(x) may denote a learning method (for example, the CNN) used for deep learning, and y may denote a result of the CNN. Also, it may be assumed that in a deep learning result, 0 is calculated in a normal state, and 1 is calculated in a breakdown state. First, by inputting image data (i.e., labelled data), where the normal state and the breakdown state are known, to f(x) as input data "x", deep learning may be performed while continuously changing f(x) until a normal result is calculated. In other words, deep learning may be performed while changing a function of f(x), so that in image data corresponding to the normal state, a y value that is approximately 0 is calculated, and in image data corresponding to the normal state, a y value that is approximately 1 is calculated.

After f(x) having a described level is obtained, image data (i.e., unlabelled data) where the normal state and the breakdown state are not known may be input to f(x) as the input data "x", and the y value may be checked. When the y value is close to 1, the normal state may be determined. When the y value is close to 0, the breakdown state may be determined, whereupon labelling the normal state or the breakdown state may be performed. Subsequently, data (i.e., newly labelled data) where the normal state or the breakdown state is newly determined may be again used as labelled data in deep learning, and, thus, may enhance the accuracy or matchability of deep learning. The CNN will be described below in more detail with reference to FIGS. 5 to 6C.

The diagnosis unit 300 may determine the state of the equipment 2000 based on a result of deep learning performed by the deep learning unit 220. For example, when the y value corresponding to the result of the deep learning based on the CNN is close to 1, the diagnosis unit 300 may diagnose that the equipment 2000 is in a breakdown state, and when the y value is close to 0, the diagnosis unit 300 may diagnose that the equipment 2000 is in a normal state.

The diagnosis unit 300 may be a separate device independent from the preprocessing/learning computer 200 and may receive the deep learning result from the deep learning unit 220 to diagnose a state of the equipment 2000. According to an embodiment, the diagnosis unit 300 may be a diagnosis processor and may be included in the preprocessing/learning computer 200.

The feedback unit 400 may provide a diagnosis result, obtained from the diagnosis unit 300, to a user online and/or off-line, e.g., physical, local feedback. For example, the feedback unit 400 may provide the diagnosis result to the user by using various means, e.g., electronic mail, social network service (SNS), a light-emitting diode (LED), a buzzer, etc. Also, the feedback unit 400 may provide in real time the diagnosis result to the user by using a mobile device or an online device, e.g., a PC, a smartphone, a tablet PC, and the like. Therefore, the equipment diagnosis system 1000 may correspond to a real-time monitoring system that monitors a state of the equipment 2000 in real time. When the state of the equipment 2000 is diagnosed as the breakdown state, the feedback unit 400 may perform an equipment interlocking operation of providing a signal to the equipment 2000 directly or through the sensor and/or control unit 1500 to stop operation of the equipment 2000.

The feedback unit 400 may be a separate device independent from the preprocessing/learning computer 200 and may provide a diagnosis result of the equipment 2000, transferred from the diagnosis unit 300, to the user. According to an embodiment, the feedback unit 400 may be a feedback processor and may be included in the preprocessing/learning computer 200. According to an embodiment, the feedback unit 400, separate from the preprocessing/learning computer 200, may be omitted.

In the equipment diagnosis system 1000 according to the present embodiment, the preprocessing unit 210 may convert time series data from the equipment 2000 into frequency data. In particular, the preprocessing unit 210 may perform preprocessing in which temporal information is included with the frequency data, thereby solving a problem where data size increases and removing the need of detailed interval extraction based on image data. Also, in the equipment diagnosis system 1000 according to the present embodiment, the deep learning unit 220 may perform deep learning through the CNN, based on the frequency data from the preprocessing unit 210. Thus, the state of the equipment 2000 may be accurately and effectively determined, thereby diagnosing the equipment 2000.

Figure 2:
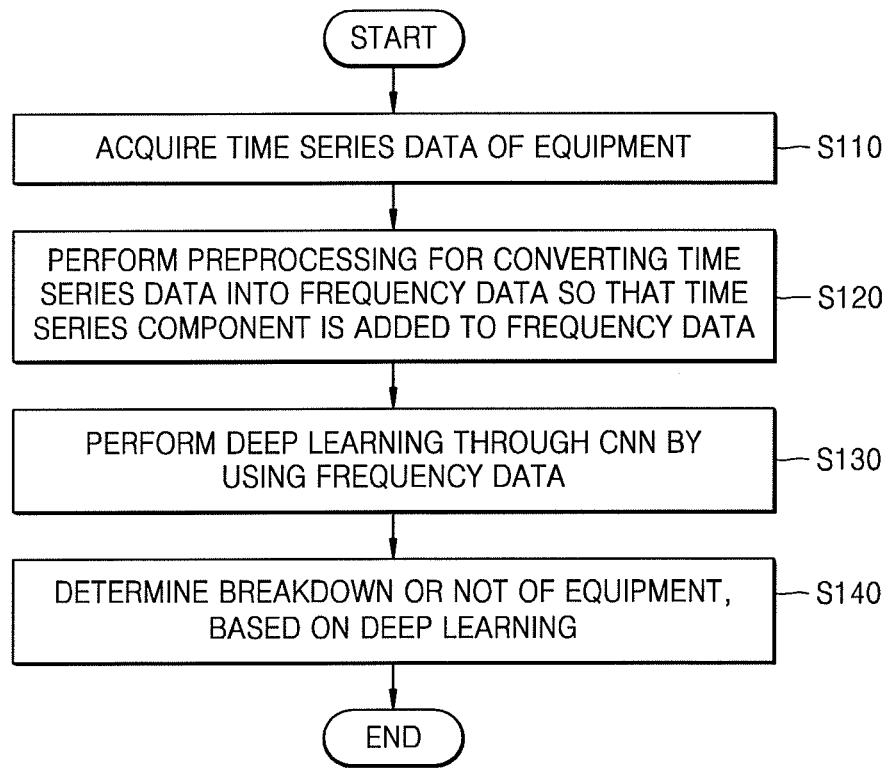
FIG. 2 illustrates a flowchart of a process of an equipment diagnosis method according to an embodiment.

FIG. 2 is a flowchart illustrating a process of an equipment diagnosis method according to an embodiment. The equipment diagnosis method of FIG. 2 may be performed by, e.g., the equipment diagnosis system 1000 of FIG. 1. The equipment diagnosis method according to the present embodiment will be described below with reference to FIGS. 1 and 2, and description given above with reference to FIG. 1 will not be repeated or will be briefly given.

Referring to FIG. 2, first, the DAQ unit 100 may acquire time series data (i.e., data in a time domain) from the equipment 2000 which is to be diagnosed in operation S110. Alternatively or additionally, according to an embodiment, in a data acquiring process (S110), other types of data, e.g., text data such as the specification of the equipment 2000 may be acquired. Also, in the data acquiring process (S110), the DAQ unit 100 may acquire various pieces of time series data of the equipment 2000, instead of one piece of time series data of the equipment 2000. For example, in the data acquiring process (S110), the DAQ unit 100 may acquire torque data and speed data of a motor included in equipment 2000, vibration data, temperature data, atmospheric pressure data, and pressure data of the equipment, and slope data and current data of the equipment 2000. Furthermore, in the data acquiring process (S110), the DAQ unit 100 may acquire time series data of various same kinds of equipment and/or various different kinds of equipment, instead of a single piece of equipment. In this case, data may be acquired through the sensor and/or control unit 1500, and the sensor and/or control unit 1500 may be provided as an element of the DAQ unit 100.

Subsequently, in operation S120, the preprocessing unit 210 may convert the time series data into frequency data through a Fourier transform. In this case, may perform preprocessing in order for a time series characteristic or component to be added to the frequency data. In the preprocessing process (S120), the preprocessing unit 210 may convert the time series data into the frequency data through, for example, an STFT or a waterfall FFT. Here, in order to accurately diagnose the equipment 2000 and to reduce the amount of data of subsequent deep learning, a time period of the STFT or a time interval of the waterfall FFT may be set based on an operation time or an operation period of the equipment 2000. Such preprocessing may not be performed on data other than time series data.

After the preprocessing process (S120), the deep learning unit 220 may perform deep learning through the CNN, based on the frequency data in operation S130. A basis for accurately and effectively determining the breakdown or not of the equipment 2000 may be provided by performing the deep learning through the CNN. For example, the deep learning unit 220 may perform the deep learning on a small amount of labelled data through the CNN, and then, may perform labelling of a normal state and a breakdown state on a large amount of unlabelled data. Also, newly labelled data may be used for the deep learning based on the CNN, thereby enhancing the diagnostic accuracy of determining a state of the equipment.

After the deep learning process (S130), the diagnosis unit 300 may determine the state of the equipment 2000, based on the deep learning in operation S140. For reference, determination of the breakdown or not of equipment may be the same concept as the above-described labelling of unlabelled data. For example, when labelling is a process of classifying unlabelled data (i.e., data where a normal state and a breakdown state are not known) as data corresponding to normality or breakdown according to a deep learning result, determination of the breakdown or not of equipment may be a process of synthesizing newly labelled data to finally determine the normality or breakdown of corresponding equipment.

In the equipment diagnosis method according to the present embodiment, the preprocessing unit 210 may convert the time series data from the equipment 2000 into the frequency data that includes temporal information in addition to the frequency data. Also, the deep learning unit 220 may perform deep learning through the CNN, based on the frequency data from the preprocessing unit 210, thereby more accurately and efficiently determining the breakdown or not of corresponding equipment.

Figure 3A:
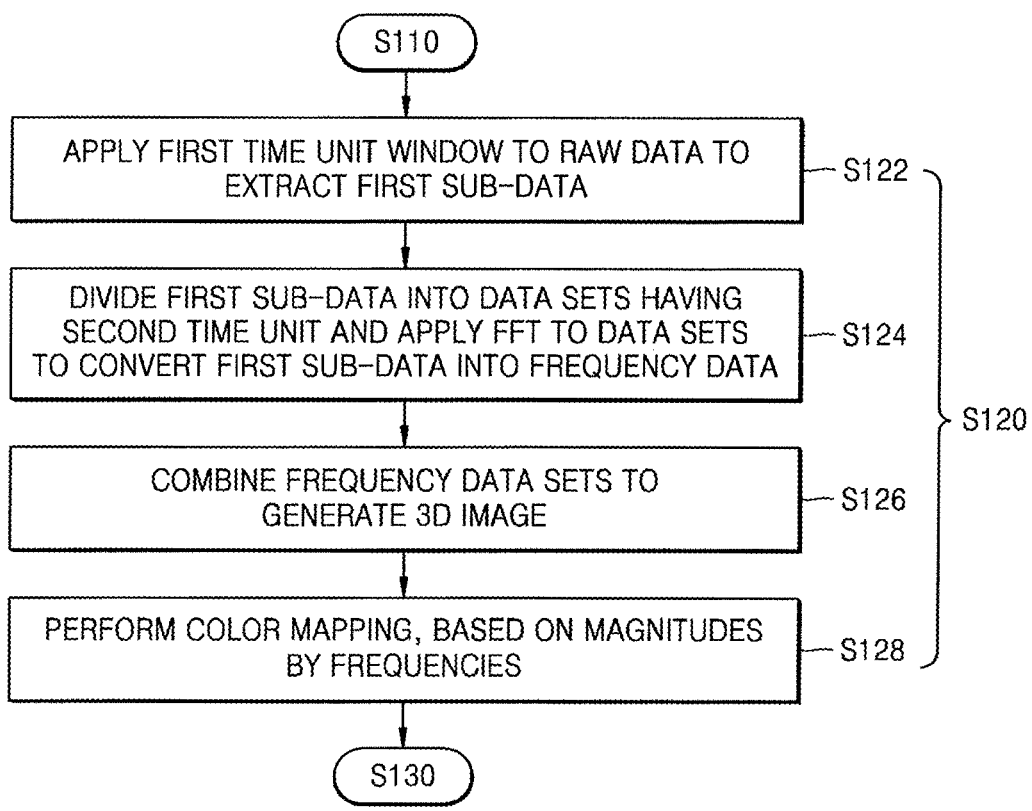
FIG. 3A illustrates a flowchart of in detail a preprocessing process in the equipment diagnosis method of FIG. 2.
Figure 3B:
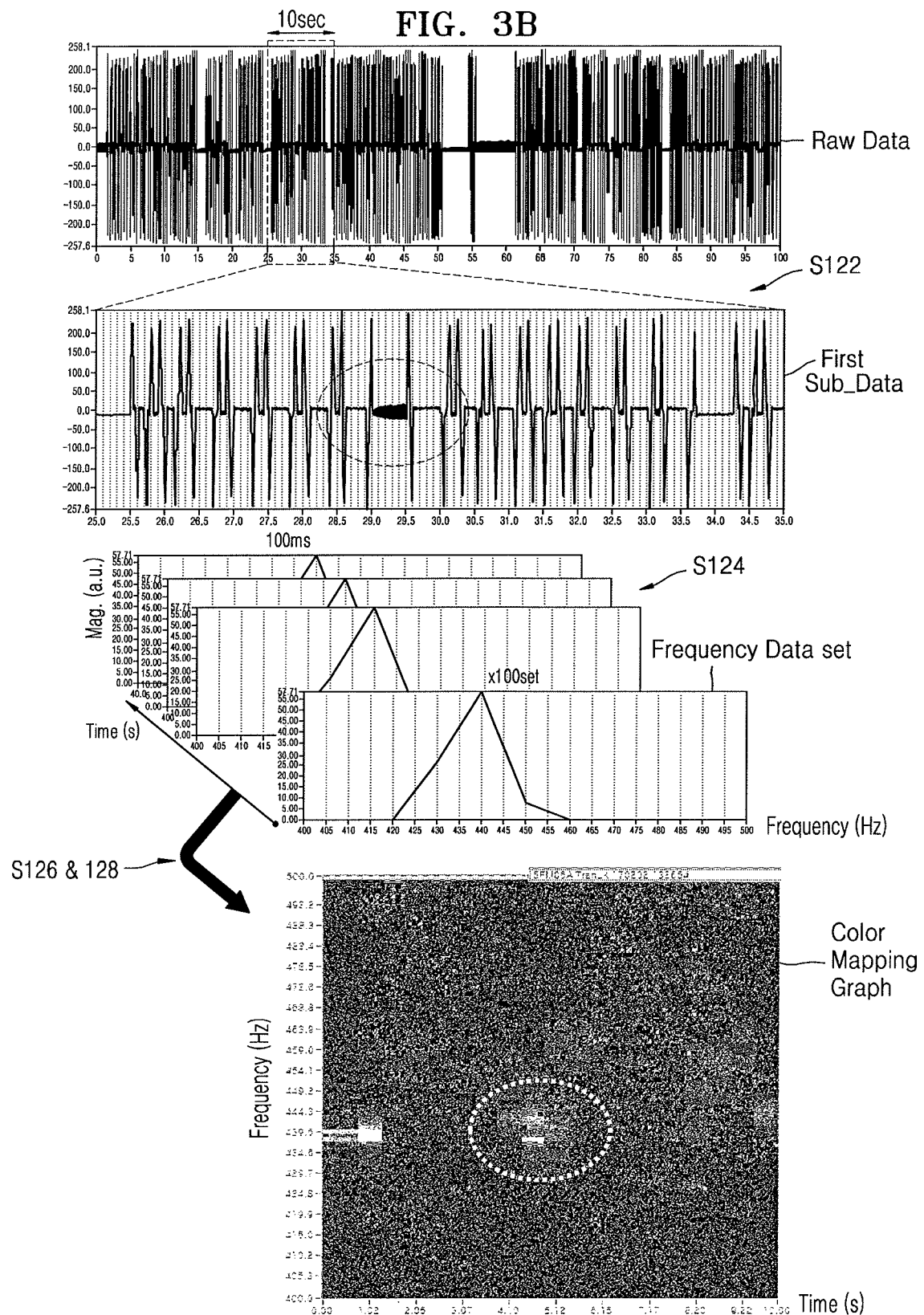
FIG. 3B illustrates a graph corresponding to the preprocessing process of FIG. 3A.

FIG. 3A is a flowchart illustrating in detail a preprocessing process in the equipment diagnosis method of FIG. 2, and FIG. 3B is a graph corresponding to the preprocessing process of FIG. 3A. For example, FIG. 3A is a flowchart illustrating a process of STFT, and FIG. 3B is a graph corresponding thereto. In the two graphs shown in FIG. 3B, the X axis may represent time, and the Y axis may represent data size.

Referring to FIGS. 3A and 3B, first, first sub-data may be extracted by applying a window having a first time unit to raw data in operation S122. Here, the first time unit may be, for example, 10 sec. The window may be, e.g., a Tukey or cosine-tapered window, and may partially overlap by units of time. The first time unit may be set based on an operation time or an operation period of the equipment 2000. For example, in a case where the equipment 2000 operates repeatedly, the first time unit may be set to include at least one repetition period. For reference, in the first sub-data of FIG. 3B, a portion illustrated as a dashed-line circle may denote a portion where an abnormality occurs.

Subsequently, in operation S124, the first sub-data may be divided into a plurality of data sets having a second time unit and, by applying an FFT to each of the data sets, the first sub-data may be converted into frequency data. A plurality of frequency data sets may be generated by applying the FFT to the data sets. For example, the second time unit may be 100 ms, e.g., when the first time unit of the first sub-data is 10 sec, the first sub-data may be divided into 100 data sets, based on the second time unit.

In the FFT, a frequency range may be determined based on a data characteristic of corresponding equipment. For example, for vibration data, when breakdown occurs, a magnitude or form of a frequency may be changed or a new frequency may be generated, based on a range of 1 kHz to 20 kHz. As another example, for current data, a frequency characteristic may be changed or a new frequency may be generated, based on a range of about 200 kHz, and for torque data, a frequency characteristic may be changed or a new frequency may be generated, based on a range of 1 Hz to 500 Hz. FIG. 3B shows a graph when the FFT is performed on each of the data sets within a range of 400 Hz to 500 Hz, e.g., for torque data.

Subsequently, in operation S126, the frequency data sets may be combined, and thus, may be converted into an image representing a three-dimensional (3D) graph. To provide a more detailed description, the X axis and the Y axis of each of the frequency data sets may be the same, and each of the frequency data sets may represent the second time unit. Therefore, the Z axis may be introduced, and by stacking the frequency data sets by the second time unit in a Z-axis direction, the frequency data sets may be converted into the image representing the 3D graph. The 3D graph may have a form similar to that of the graph of FIG. 3C generated by applying a waterfall FFT.

Subsequently, in operation S128, a two-dimensional (2D) image may be generated by performing color mapping, based on a magnitude of each frequency. In other words, the 3D graph may be converted into a 2D graph by changing a magnitude parameter to a color parameter. The last graph of FIG. 3B may correspond to 2D image data. Graphs of FIG. 3B are shown in black and white, and thus, the last graph is shown in only black-and-white contrast. However, according to some embodiments, a magnitude of each frequency may be mapped in black-and-white contrast instead of colors.

Figure 3C:
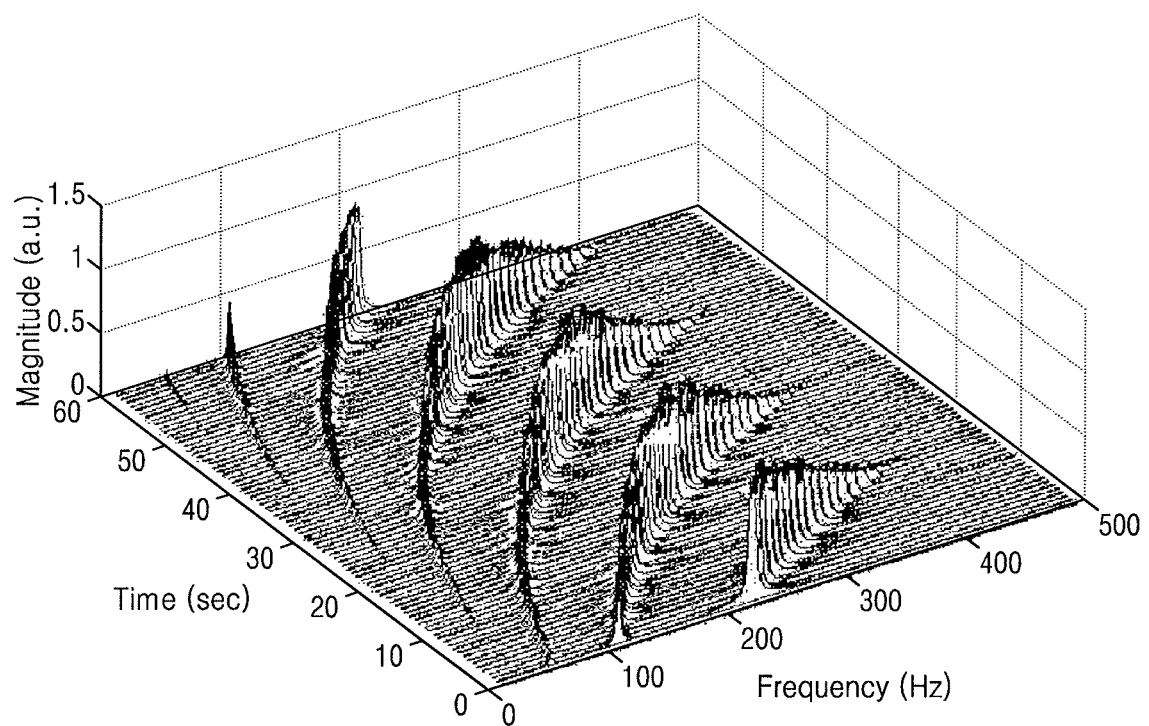
FIG. 3C illustrates a graph obtained through a preprocessing process which differs from the preprocessing process of FIG. 3A.

FIG. 3C is a graph obtained through a preprocessing process which differs from the preprocessing process of FIG. 3A, and for example, is a graph showing a result of preprocessing based on a waterfall FFT. Referring to FIG. 3C, a waterfall FFT denotes a FFT including a time history and may be shown as a 3D graph. The waterfall FFT may be obtained through, for example, a Gabor transform, i.e., a Fourier transform which uses a Gaussian distribution function (a normal distribution) as a window function. For reference, the window function may be a function which is multiplied for extracting a certain portion from a whole period, and in the Gabor transform (i.e., the waterfall FFT), the FFT may be performed by multiplying a sample by the normal distribution. In an STFT, a Tukey window may be used as the window function as described above. Similar to a 3D graph of the STFT, a 3D graph of the waterfall FFT may be changed to 2D image data through color mapping.

Figure 4A:
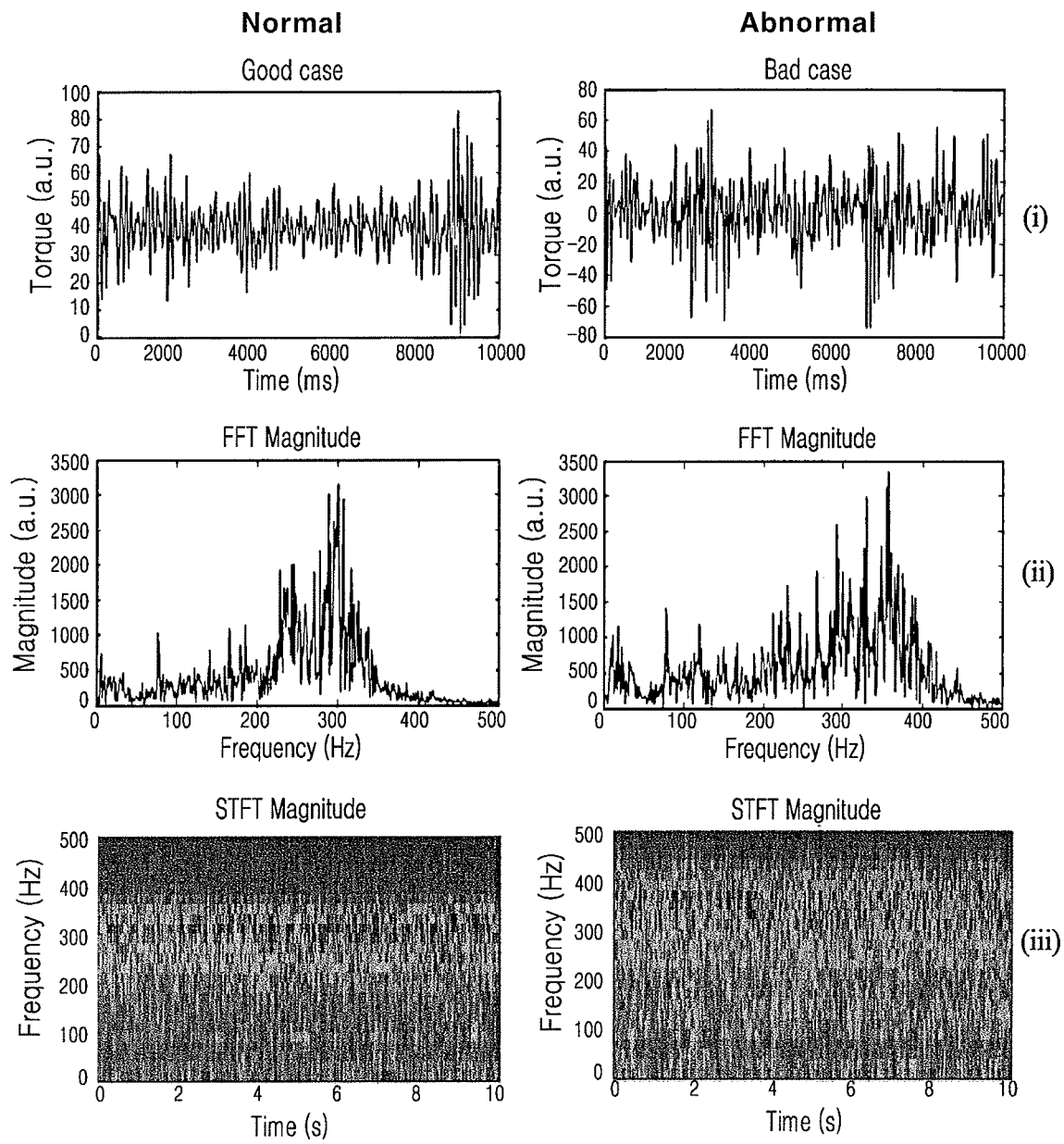
FIG. 4A illustrates a graph corresponding to a data acquisition process of the equipment diagnosis method of FIG. 2, a general fast Fourier transform (FFT), and the preprocessing process of FIG. 3A.

FIG. 4A shows graphs corresponding to a data acquisition process of the equipment diagnosis method of FIG. 2, a general FFT, and the preprocessing process of FIG. 3A. In FIG. 4A, graphs on the left hand side correspond to a normal state of equipment and graphs on the right hand side correspond to an abnormal or breakdown state of the equipment.

Referring to FIG. 4A, first, uppermost graphs (i) are of vibration data of equipment acquired in the data acquiring process (S110) and middle graphs (ii) are of frequency data obtained by performing general FFT on vibration data. The graphs (ii) of the frequency data have small differences in magnitude and form of a frequency. Thus, the graphs (ii) of the frequency data are of limited use for quantifying a normal state and a breakdown state of equipment.

Lowermost graphs (iii) are of 2D image data acquired through an STFT in the preprocessing process (S120). In the graphs (iii) of the 2D image data, a magnitude of a frequency in a bright portion of a right graph is higher along an entirety of the time interval than that of a frequency in a bright portion of the left graph. Therefore, determination of a normal state and a breakdown state of equipment to diagnose the equipment may be made based on a magnitude of a certain frequency. However, as described above, there may be equipment where breakdown is easily checked through the STFT, or there may be equipment which is ambiguous to check breakdown through the STFT. Also, despite the same equipment, the check of breakdown may be ambiguous, based on the kind of acquired data. Due to this, there is a limitation in determining the breakdown or not of equipment to diagnose the equipment through only the STFT.

Figure 4B:
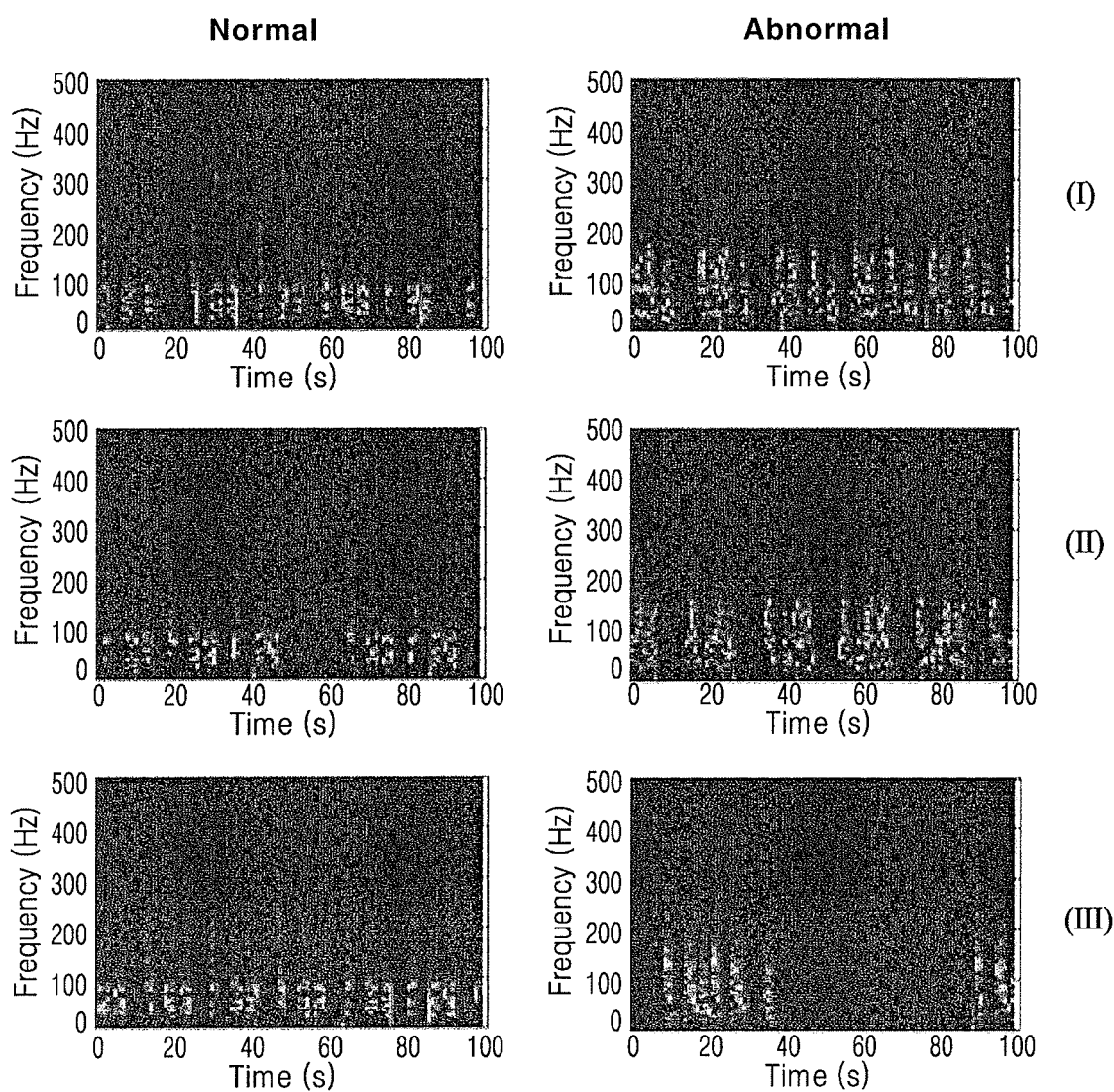
FIG. 4B illustrates a graph obtained through the preprocessing process of FIG. 3A.

FIG. 4B shows graphs obtained through the preprocessing process of FIG. 3A. In FIG. 4B, graphs on the left hand side correspond to a normal state of equipment and graphs on the right hand side shows graphs correspond to an abnormal or a breakdown state of the equipment.

Referring to FIG. 4B, graphs (I), (II), and (III) all illustrate 2D image data obtained through an STFT for torque data of the equipment. Comparing a left graph with a right graph to one another along the rows, a difference between 2D image data of a normal state of the equipment and 2D image data of a breakdown state of the equipment may be clearly determined. However, the difference between the 2D image data of the normal state and the 2D image data of the breakdown state is shown in various forms, i.e., along the column direction. Thus, there is a limitation in checking the difference according to a single criterion. Also, even in a case where 2D image data is obtained through the STFT as described above, a difference between the normal state and the breakdown state cannot be sometimes checked depending on equipment.

Therefore, a method of more accurately and efficiently determining a normal state and a breakdown state of equipment regardless of the kind of the equipment and/or the kind of acquired data will be described below in accordance with embodiments. In the equipment diagnosis method according to embodiments, deep learning may be performed through a below-described CNN, for accurate and efficient determination of the state of the equipment.

Figure 5:
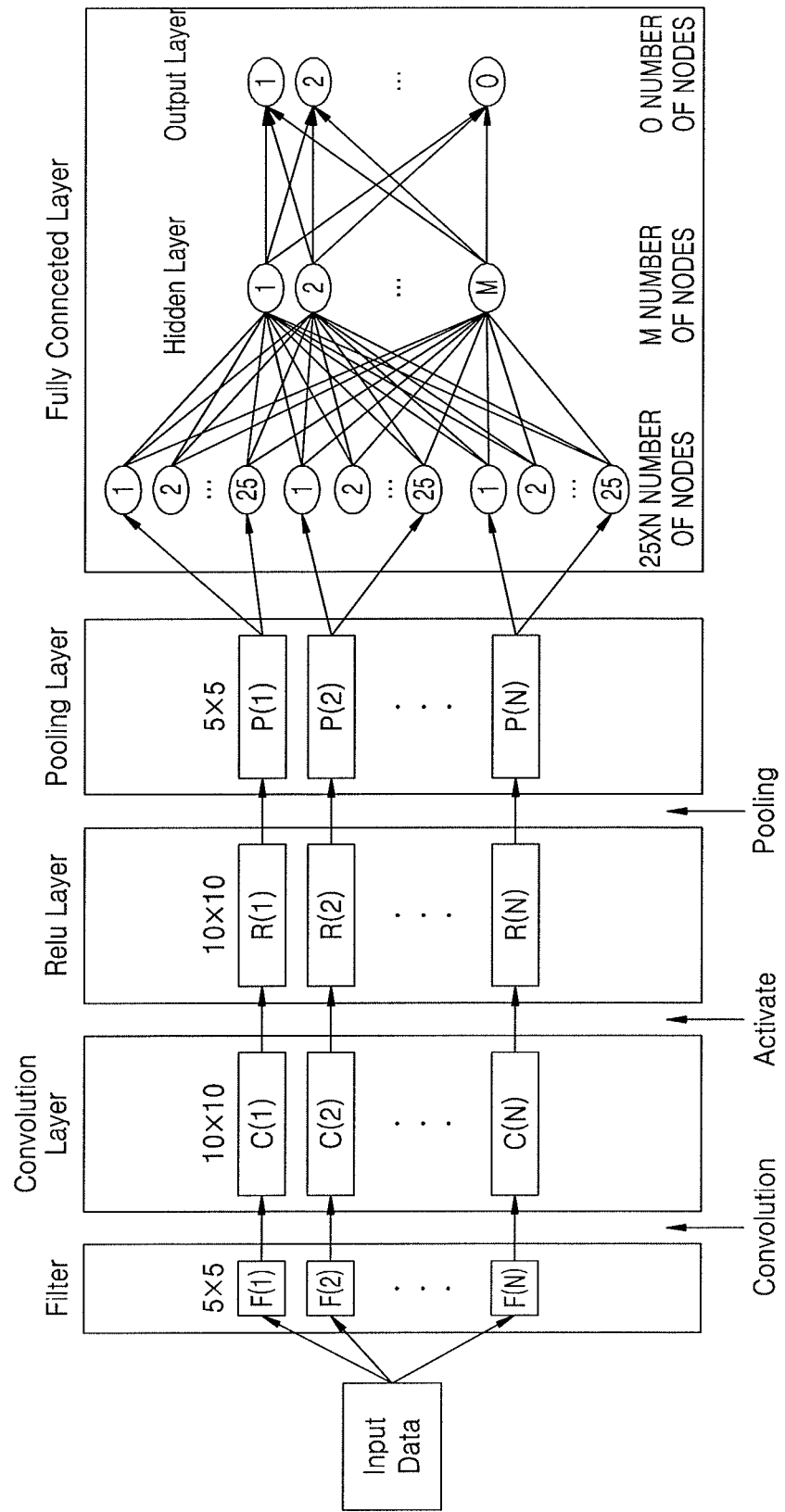
FIG. 5 illustrates a conceptual diagram of a deep learning process based on a convolution neural network (CNN) in the equipment diagnosis method of FIG. 2.
Figures 6A, 6B:
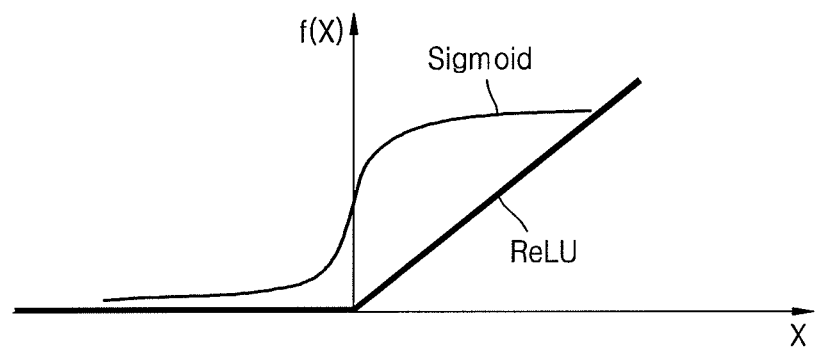
FIG. 6A illustrates a conceptual diagram for describing convolution in the deep learning process of FIG. 5.
FIG. 6B illustrates a graph showing an activation function in the deep learning process of FIG. 5.
Figure 6C:
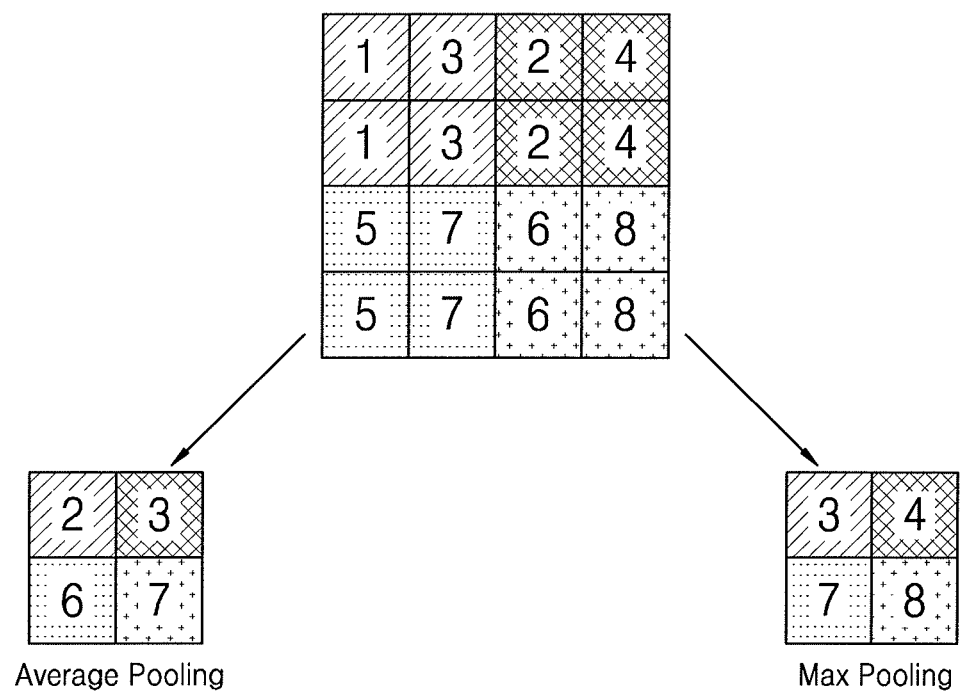
FIG. 6C illustrates a conceptual diagram for describing pooling in the deep learning process of FIG. 5.

FIG. 5 is a conceptual diagram illustrating a deep learning process based on a CNN in the equipment diagnosis method of FIG. 2. FIG. 6A is a conceptual diagram for describing convolution in the deep learning process of FIG. 5. FIG. 6B is a graph showing an activation function in the deep learning process of FIG. 5. FIG. 6C is a conceptual diagram for describing pooling in the deep learning process of FIG. 5.

Referring to FIGS. 5 and 6A, first, by applying a convolution filter to input data, a feature map may be extracted from the input data to form a convolution layer. Here, the input data may be, e.g., 2D image data obtained through an STFT.

The convolution filter may be a filter used to extract a feature from image data and may have a matrix form. The convolution filter may be provided in plural. For example, in FIG. 5, a plurality of convolution filters F(l) to F(N) are arranged in a 5×5 matrix form. A process of applying the convolution filters F(1) to F(N) to 2D image data to extract a plurality of feature maps C(1) to C(N) may be referred to as a convolution, and the extracted feature maps C(1) to C(N) may configure a convolution layer. In FIG. 5, when the 2D image data, i.e., the input data, is provided as a 16×16 matrix, 10×10 feature maps may be generated through a convolution performed by a convolution filter having a 5×5 matrix form, and N number of feature maps may be generated based on the number of convolution filters.

To provide a more detailed description on a convolution process with reference to FIG. 6A, it may be assumed that 2D image data is provided as a 5×5 matrix, and a convolution filter is provided as a 3×3 matrix. As illustrated, when each factor of the convolution filter is multiplied by and added to factors of a left portion of the 2D image data, 4 may be obtained. Subsequently, 3 and 4 may be obtained by performing an arithmetic operation while moving by one cell each time in a right direction, and then, 2, 4, and 3 may be obtained by again performing an arithmetic operation from the left after moving downward by one cell. Subsequently, 2, 3, and 4 may be obtained by performing an arithmetic operation after moving downward by one cell. Accordingly, a feature map may be generated in a 3×3 matrix form. As a result, a convolution process may be referred to as a process of extracting a feature from 2D image data by using a convolution filter.

A process of extracting a feature map from image data through a convolution may be performed by units of channels. For example, image data may be extracted for each RGB channel by using an RGB filter corresponding to three channels, with respect to color image data. Subsequently, a convolution and pooling may be performed on channel-based image data and mixed data generated by mixing the channel-based image data.

Referring to FIGS. 5 and 6B, a convolution layer may be generated, and then, an active layer may be formed by applying an activation function to feature maps. The activation function may use, for example, a Sigmoid function or a Rectified Linear Unit (ReLU) function. FIG. 6B shows a graph of the Sigmoid function or the ReLU function. Generally, in a CNN, the ReLU function may be used as the activation function and may be expressed as "ReLU(x)=max (0, x)". For example, the ReLU function may be a function that compares an x value with 0 to return a large value. In FIG. 5, by applying the ReLU function, the active layer may be provided as a ReLU layer, and a plurality of maps R(1) to R(N) included in the ReLU layer may be provided in a 10×10 matrix form, based on the feature maps of the convolution layer, whereby N number of maps may be provided. According to some embodiments, the activation layer, e.g., the Relu layer, may be omitted, e.g., the convolution layer itself may have pooling, described below, performed directly thereon.

Referring to FIGS. 5 and 6C, a pooling layer may be formed by performing pooling or downsampling on maps included in a ReLU layer. A pooling process may reduce a size of maps in the ReLU layer by using a 2×2 matrix without changing features of a map of the ReLU layer or a feature map, and various methods may be used. As illustrated in FIG. 6C, an average pooling method and a max pooling method may be representatively used. The average pooling method may be a method of averaging and outputting factors of a 2×2 matrix, and the max pooling method may be a method of outputting a largest value of the 2×2 matrix. For example, in FIG. 5, by pooling the maps of the ReLU layer, the maps P(1) to P(N) included in the pooling layer may be provided in a 5×5 matrix form, and N number of maps may be provided. In the CNN of FIG. 5, forming a pooling layer from a convolution layer is illustrated only once, but in order to extract accurate features from 2D image data, forming the pooling layer from the convolution layer may be repeated at least twice or more.

The pooling layer may be formed, and then, a fully connected layer may be formed. The fully connected layer may include an input layer, a hidden layer, and an output layer. The input layer may receive, as input data, data from the pooling layer. The fully connected layer may be a portion of a deep learning process for classification and may be a layer which is fundamentally used for deep learning. For example, the fully connected layer may be a layer for classifying various kinds of images e.g., a person, a pig, a cat, a monkey, and so forth. As the number of hidden layers increases, an accuracy of classification may increase. In other words, the process from the convolution layer to the pooling layer performs a function of extracting an appropriate feature from predetermined image data, and the fully connected layer performs a function of classifying extracted features. However, in the equipment diagnosis method according to the present embodiment, since classification is for only two states, e.g., a normal state or breakdown state, the fully connected layer may be provided in a minimum structure or may be omitted. For example, a process of forming the fully connected layer may be omitted when a value of the pooling layer is simply obtained as a one-dimensional (1D) value, and the state of the equipment is determined based on the 1D value.

In the deep learning process based on the CNN (particularly, the process of forming the pooling layer from the convolution layer), a factor value of a convolution filter may continuously vary so as to extract the most appropriate feature from image data. Therefore, the deep learning process based on the CNN may be referred to as a process of searching for a convolution filter for extracting an optimal feature from the image data. For example, in the process "x→f(x)→y" in the description given above with reference to FIG. 1, f(x) described as the CNN may correspond to a convolution filter in detail, and thus, changing f(x) may correspond to changing of the convolution filter. However, labelled data may be needed to determine an appropriate convolution filter at an initial stage. In other words, deep learning may be performed through the CNN by using data where a normal state and a breakdown state of equipment have been checked or verified, and thus, an appropriate convolution filter may be determined. After the appropriate convolution filter is determined, deep learning may be performed on unlabelled data through the CNN to perform labelling, and a process of generating a more appropriate convolution filter may be performed by using newly labelled data as labelled data.

Figure 7:
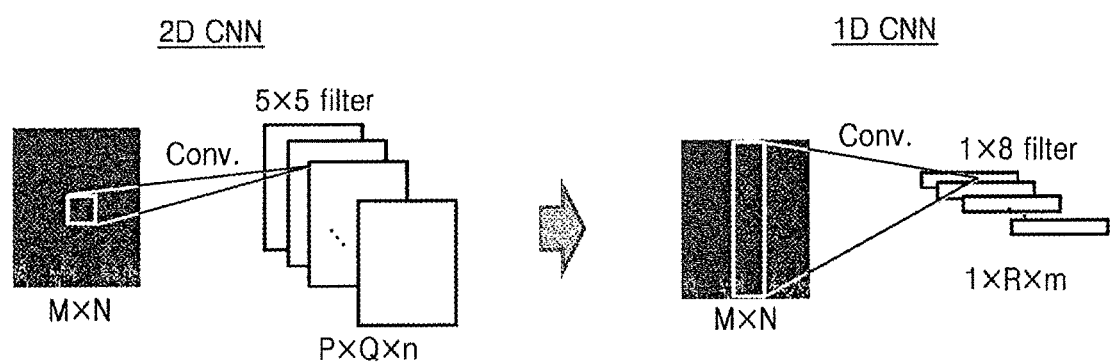
FIG. 7 illustrates a conceptual diagram for describing a two-dimensional (2D) CNN and a one-dimensional (1D) CNN in the deep learning process of FIG. 5.

FIG. 7 is a conceptual diagram for describing a two-dimensional (2D) CNN and a 1D CNN in the deep learning process of FIG. 5. Referring to FIG. 7, the left side illustrates a concept of a 2D CNN and may correspond to a process of applying n number of 5×5 filters to M×N image data to extract n number of P×Q feature maps. The concept of the 2D CNN may be substantially the same as a process described above with reference to FIGS. 5 and 6A.

The right illustrates a concept of a 1D CNN and may correspond to a process of applying m number of 1×8 filters to M×N image data to extract m number of 1×R feature maps. In the 1D CNN, 1D features may be more easily extracted from image data by using 1D filters having different weight values. For example, when image data having different features by frequency bands, a feature of a frequency may be more precisely extracted than the 2D CNN by applying 1D filters having different weight values by frequency bands for time intervals to image data.

Figure 8:
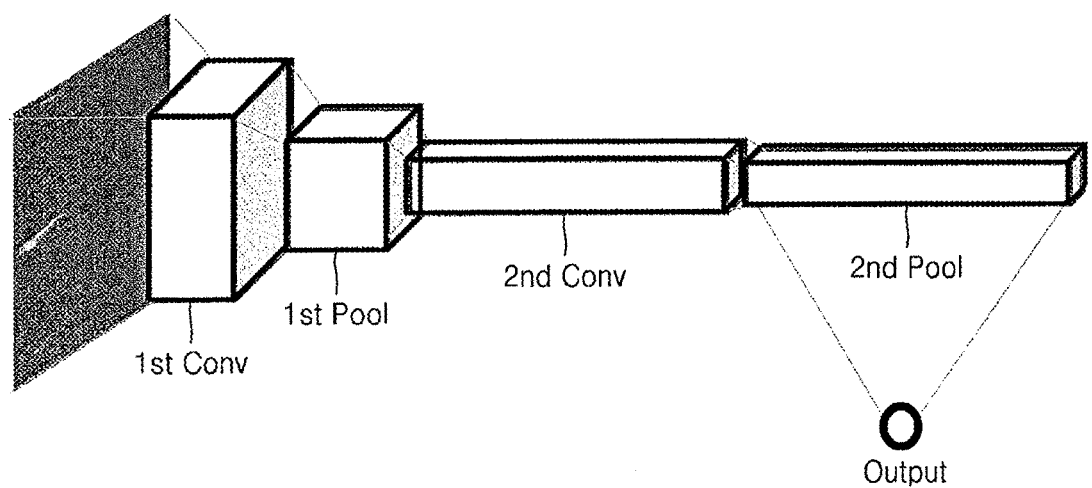
FIG. 8 illustrates a conceptual diagram for describing a structure of a two-layer CNN in the deep learning process of FIG. 5.

FIG. 8 is a conceptual diagram for describing a structure of a two-layer CNN in the deep learning process of FIG. 5. Referring to FIG. 8, a first-layer convolution (1st Cony) and first-layer pooling (1st Pool) may be performed on 2D image data. A second-layer convolution (2nd Cony) and second-layer pooling (2nd Pool) may be performed after the first-layer pooling (1st Pool), thereby calculating a result value. Also, an activation function may be applied between the first-layer convolution (1st Cony) and the first-layer pooling (1st Pool) and between the second-layer convolution (2nd Cony) and the second-layer pooling (2nd Pool). Also, after the second-layer pooling (2nd Pool), a fully connected layer may not be created.

In an equipment diagnosis method according to the present embodiment, deep learning may be performed based on only a two layer CNN structure. Thus, the state of equipment may be accurately and efficiently determined based on high sparsity, fewer parameters, and low overfitting in comparison with a general CNN using a fully connected layer.

The first-layer convolution (1st Cony) and the first-layer pooling (1st Pool) may correspond to a 2D CNN, and the second-layer convolution (2nd Cony) and the second-layer pooling (2nd Pool) may correspond to a 1D CNN. Alternatively, all of the first-layer convolution (1st Cony), the first-layer pooling (1st Pool), the second-layer convolution (2nd Cony) and the second-layer pooling (2nd Pool) may be based on the 1D CNN. Further alternatively, in addition to the two-layer CNN, a one-layer CNN or a three or more-layer CNN may be used. Furthermore, in the equipment diagnosis method according to the present embodiment, a CNN layer may be implemented in various forms. However, a diagnosis matching rate of equipment, a calculation time needed for an arithmetic operation, and the specification of a computer may be changed based on a configuration of a CNN layer. Accordingly, a configuration of a CNN layer having an appropriate form may be selected based on the number and environments of pieces of equipment which are to be diagnosed.

Figure 9:
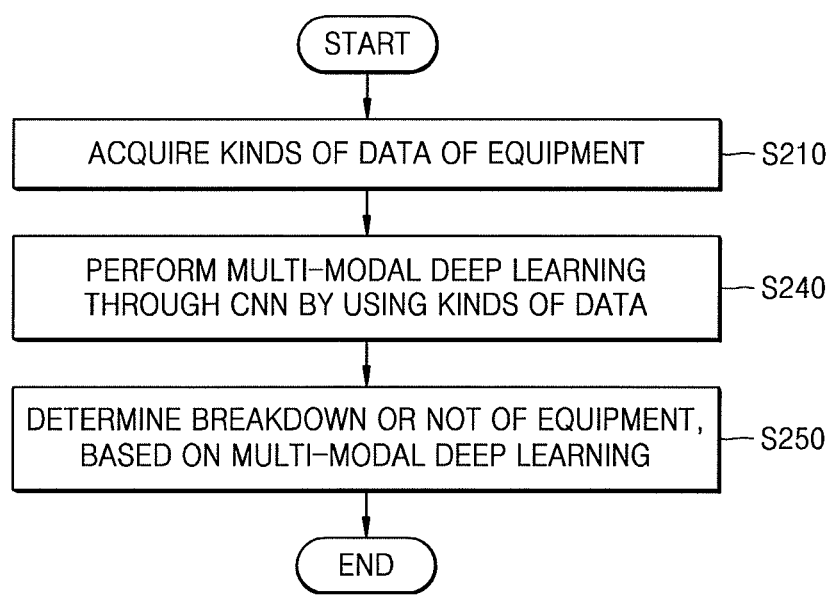
FIG. 9 illustrates a flowchart of a process of an equipment diagnosis method according to an embodiment.

FIG. 9 is a flowchart illustrating a process of an equipment diagnosis method according to an embodiment. The equipment diagnosis method of FIG. 9 may be performed by, for example, the equipment diagnosis system 1000 of FIG. 1. Hereinafter, the equipment diagnosis method according to the present embodiment will be described with reference to FIGS. 1 and 9, and descriptions given above with reference to FIGS. 1 to 8 will not be repeated or will be briefly given.

Referring to FIG. 9, first, the DAQ unit 100 may acquire a plurality of kinds of data of equipment in operation S210. Here, the plurality of kinds of data may include different kinds of time series data and non-time series data. For example, the time series data may include vibration data, speed data, and torque data described above with reference to FIG. 1, and the non-time series data may include text data of the equipment.

Subsequently, in operation S240, the deep learning unit 220 may perform multi-modal deep learning through the CNN using the plurality of kinds of data. The multi-modal deep learning may be a method of synthetically analyzing different kinds of data and will be described below in more detail with reference to FIGS. 10A to 12B.

Before performing the multi-modal deep learning, at least some of the plurality of kinds of data may be converted into frequency data including a temporal component through preprocessing by the preprocessing unit 210. For example, the preprocessing may be performed through an STFT.

Subsequently, in operation S250, the diagnosis unit 300 may determine the state of the equipment, based on the multi-modal deep learning. In the equipment diagnosis method according to the present embodiment, since the multi-modal deep learning is performed through the CNN by using different kinds of data, a diagnosis matching rate of equipment is enhanced. For example, deep learning may be performed through the CNN by using A data of a first type and deep learning may be performed through the CNN by using B data of a second type. Then, when equipment is diagnosed based on each of the deep learnings separately, a diagnosis matching rate of each deep learning may be lower than 80%. On the other hand, the multi-modal deep learning may be performed through the CNN by using both the A data and the B data, such that a diagnosis matching rate is enhanced by 90% or more. Such an effect may be referred to as an ensemble effect. The A data and the B data may be different kinds of time series data, e.g., torque image data and speed image data, or may be one kind of time series data and one kind of non-time series data.

Figure 10A:
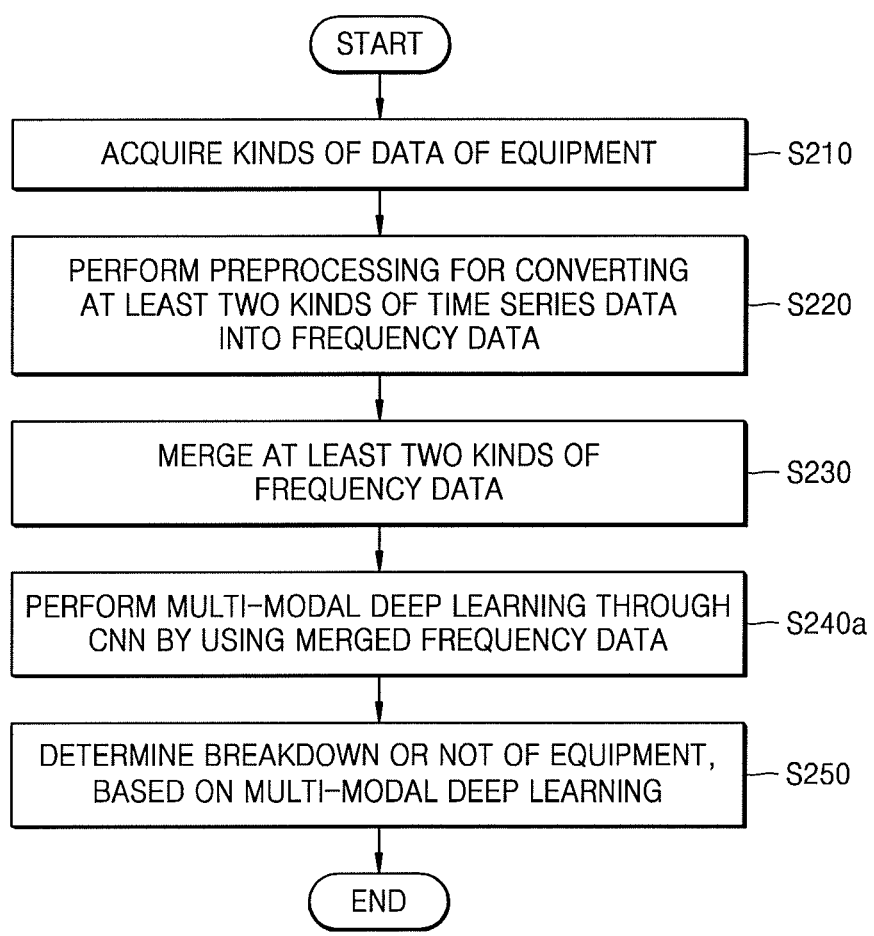
FIG. 10A illustrates a flowchart of a process of an equipment diagnosis method according to an embodiment.
Figure 10B:
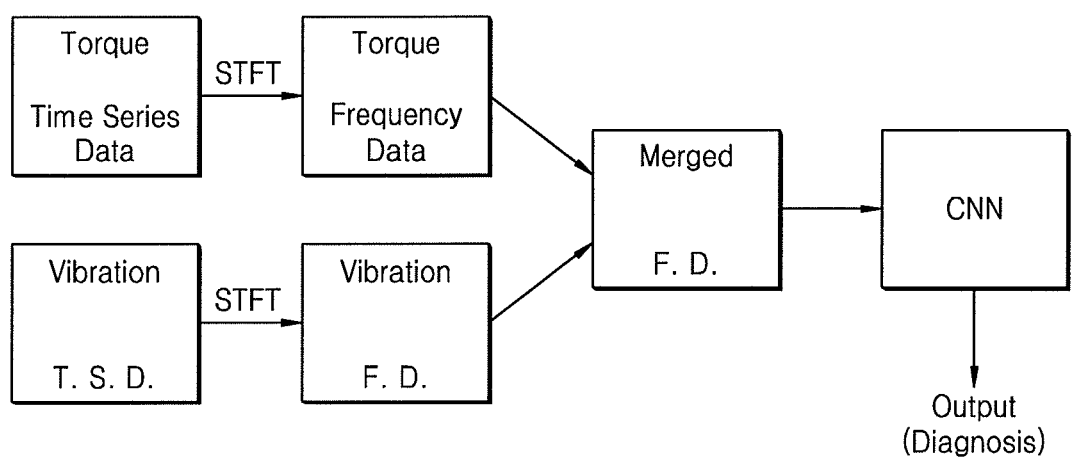
FIG. 10B illustrates a block diagram of the equipment diagnosis method of FIG. 10A.
Figure 10C:
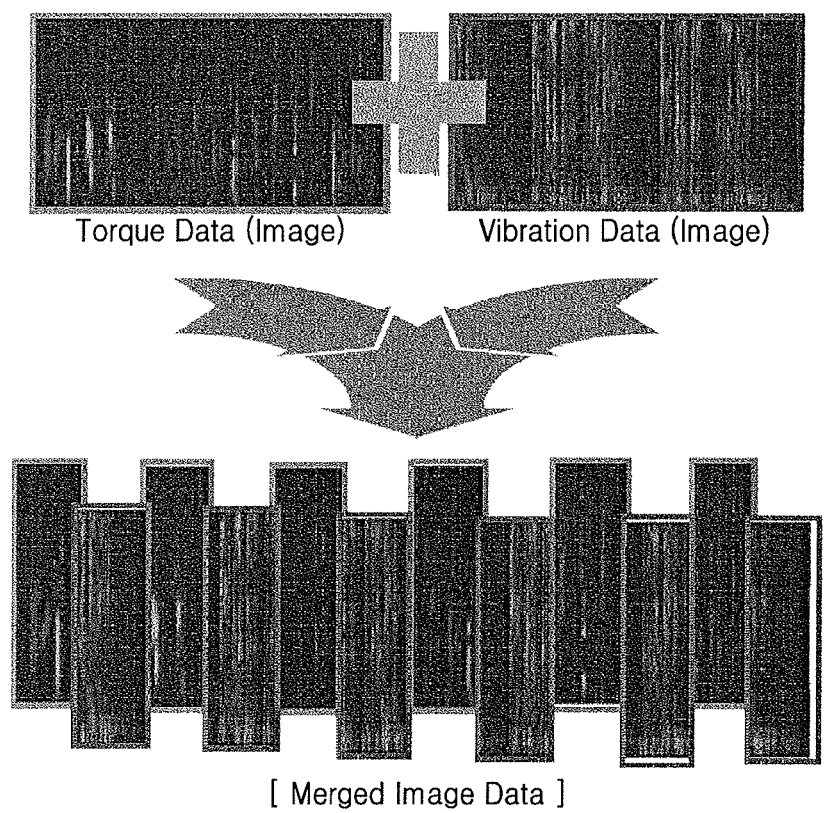
FIGS. 10C and 10D illustrate graphs exemplarily showing merging of frequency data in a frequency data merging process of FIG. 10A.
Figure 10D:
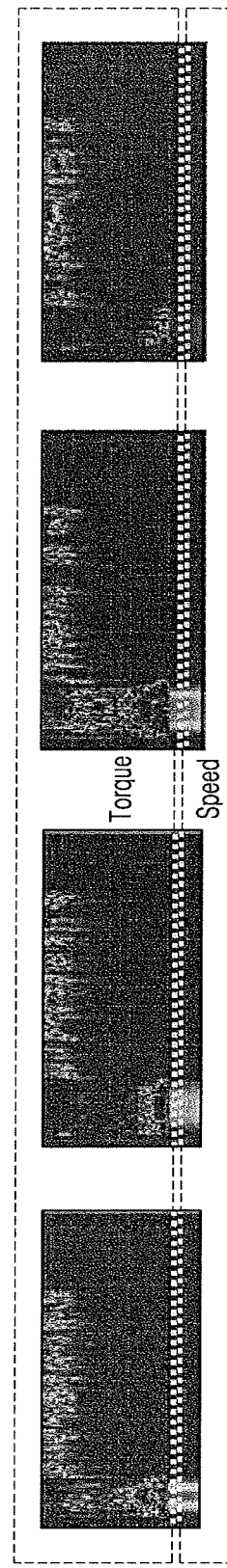

FIG. 10A is a flowchart illustrating a process of an equipment diagnosis method according to an embodiment. FIG. 10B is a block diagram conceptually illustrating the equipment diagnosis method of FIG. 10A. FIGS. 10C and 10D are graphs exemplarily showing merged frequency data in a frequency data merging process of FIG. 10A. The equipment diagnosis method of FIG. 10A may be performed by, e.g., the equipment diagnosis system 1000 of FIG. 1. The equipment diagnosis method according to the present embodiment will be described below with reference to FIGS. 1 and 10A to 10D, and description given above with reference to FIG. 9 is omitted.

Referring to FIGS. 10A to 10D, first, the DAQ unit 100 may acquire a plurality of kinds of data of equipment in operation S210. Here, the plurality of kinds of data is as described above with reference to FIG. 9. In FIG. 10B, torque data and vibration data are illustrated as different kinds of time series data.

Subsequently, in operation S220, the preprocessing unit 210 may perform a preprocessing process of converting at least two kinds of time series data into at least two kinds of frequency data including a time series characteristic. For example, the preprocessing process may convert each of torque data and vibration data into frequency data. Here, the preprocessing process may be performed through, for example, an STFT.

Subsequently, in operation S230, the at least two kinds of frequency data may be merged. The at least two kinds of frequency data may be merged by the preprocessing unit 210 or by the deep learning unit 220. Alternatively, a frequency data merging process may be performed by a separate element, e.g., a data merging unit. FIG. 10C illustrates a method of merging torque image data and vibration image data, which are different kinds of frequency data. For example, the torque image data and the vibration image data may be divided in units of time intervals and may be merged in a manner where different frequency data are alternately disposed. Alternatively, as illustrated in FIG. 10D, speed image data may be in a lower portion and torque image data may be an upper portion, thereby merging different kinds of frequency data.

For reference, in FIG. 10D, the two left graphs correspond to two kinds of image data of equipment in a normal state and the right graphs correspond to two kinds of image data of equipment in a breakdown state. Through the left graphs and the right graphs, a difference between merged image data corresponding to the normal state and the breakdown state is clearer.

Subsequently, in operation S240a, the deep learning unit 220 may perform multi-modal deep learning through a CNN by using merged frequency data.

Subsequently, in operation S250, the diagnosis unit 300 may determine the breakdown or not of the equipment, based on the multi-modal deep learning. In this manner, equipment may be diagnosed through multi-modal deep learning, and thus, a diagnosis matching rate of the equipment is enhanced. For example, when deep learning is performed through the CNN by using only image data of torque of equipment, a diagnosis matching rate of the equipment is about 60%, but when multi-modal deep learning is performed through the CNN by merging torque image data and speed image data, a diagnosis matching rate of the equipment is enhanced by about 80%. That is, a diagnosis matching rate of equipment increases by about 20%.

Figure 11A:
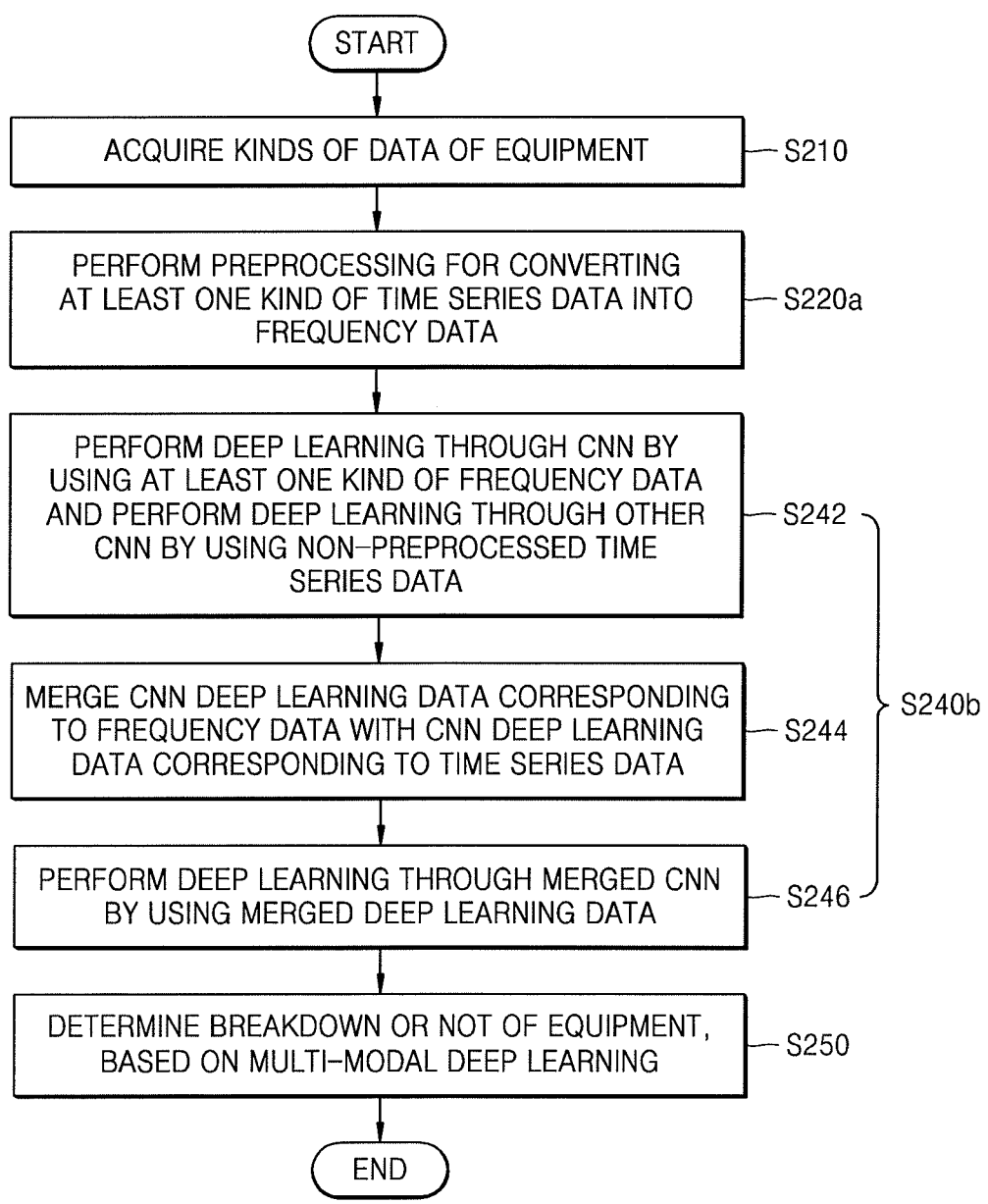
FIG. 11A illustrates a flowchart of a process of an equipment diagnosis method according to an embodiment.

FIG. 11A is a flowchart illustrating a process of an equipment diagnosis method according to an embodiment. FIG. 11B is a block diagram conceptually illustrating the equipment diagnosis method of FIG. 11A. The equipment diagnosis method of FIG. 11A may be performed by, e.g., the equipment diagnosis system of FIG. 1. The equipment diagnosis method according to an embodiment will be described below with reference to FIGS. 1, 11A, and 11B, and description given above with reference to FIGS. 9 to 10D will not be repeated.

Referring to FIGS. 11A and 11B, first, the DAQ unit 100 may acquire a plurality of kinds of data of equipment in operation S210. Here, the plurality of kinds of data are as described above with reference to FIG. 9. For example, in the equipment diagnosis method according to the present embodiment, the plurality of kinds of data may be three kinds of time series data, e.g., torque data and two kinds of speed data. Here, one of the two kinds of speed data may be general speed data, e.g., frequency data, and speed data representing a moving average, e.g., time domain data.

Subsequently, in operation S220a, the preprocessing unit 210 may perform a preprocessing process of converting at least one kind of time series data into frequency data including a time series characteristic. For example, preprocessing may be performed on two kinds of time series data of the three kinds of time series data. In detail, each of the torque data and the general normal speed data may be converted into frequency data, and the speed data representing the moving average may be maintained as time series data as-is without being converted into frequency data. Here, the preprocessing process may be performed through, e.g., an STFT. In FIG. 11B, torque frequency data after preprocessing is in an upper portion, speed frequency data after preprocessing is in a lower portion, and the speed time series data representing the moving average, on which preprocessing is not performed, is in a middle portion.

Subsequently, in operation S242, the deep learning unit 220 may perform deep learning through a CNN by using at least one kind of frequency data and may perform deep learning through another CNN by using time series data on which preprocessing is not performed. For example, the deep learning unit 220 may perform deep learning through a first CNN by using the frequency data of the torque, perform deep learning through a second CNN by using the frequency data of the speed, and perform deep learning through a third CNN by using the speed data representing the moving average.

In FIG. 11B, deep learning, which is performed through a 1D CNN by using the torque frequency data, the speed frequency data, and the speed time series data representing the moving average is illustrated. Alternatively, the deep learning may be performed through a 2D CNN or may be performed on one piece of data through a multi-layer CNN. However, in a merging process, frequency data may be merged according to a dimension, and thus, the deep learning may be performed through a CNN having the same dimension immediately before merging.

Subsequently, in operation S244, the deep learning unit 220 may merge CNN deep learning data corresponding to frequency data and CNN deep learning data corresponding to time series data. Here, merging of pieces of CNN deep learning data may merge data having the same dimension.

In operation S246, the deep learning unit 220 may perform deep learning through a merged CNN by using merged deep learning data. A deep learning process based on each of the CNNs (S242) to a deep learning process based on the merged CNN (S246) may be included in a multi-modal deep learning process (S240b).

Subsequently, in operation S250, the diagnosis unit 300 may determine the state of the equipment, based on multi-modal deep learning.

Figure 12A:
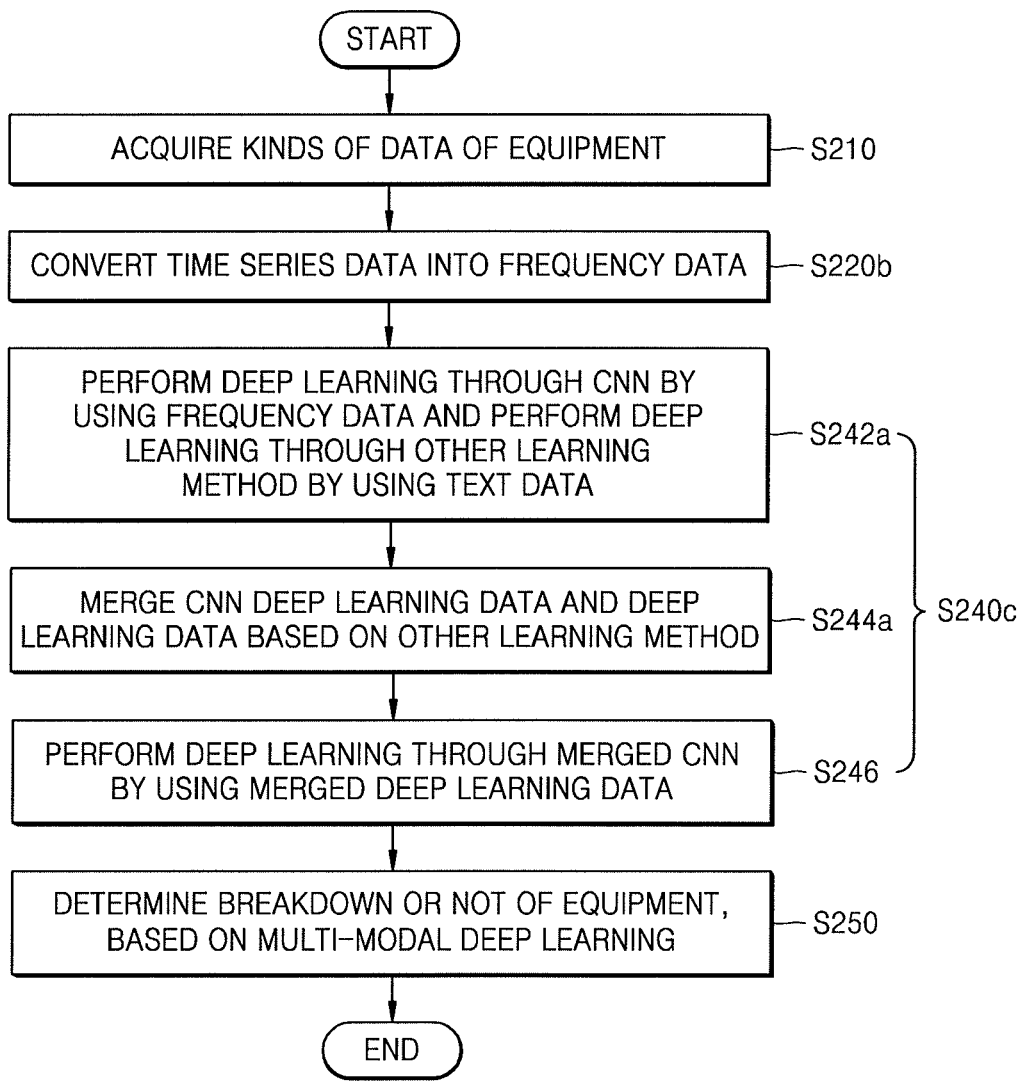
FIG. 12A illustrates a flowchart of a process of an equipment diagnosis method according to an embodiment.
Figure 12B:
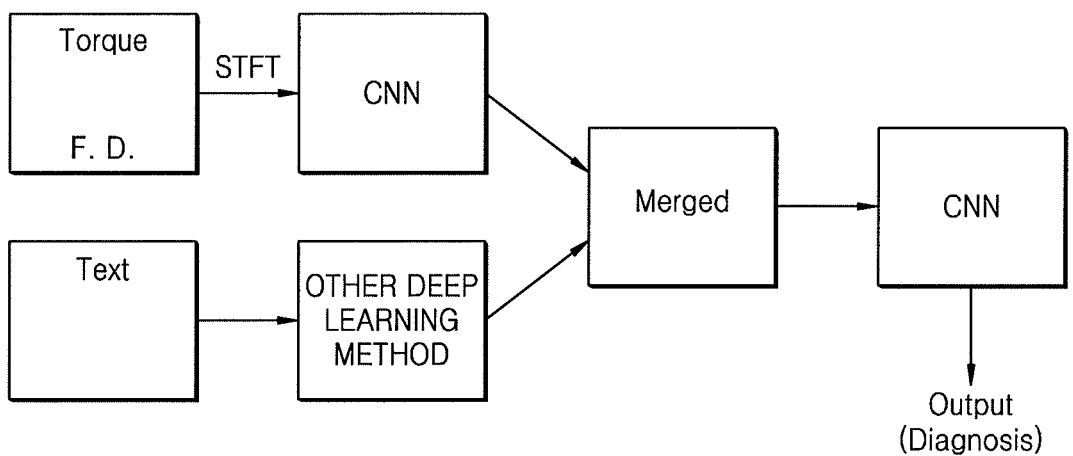
FIG. 12B illustrates a block diagram conceptually of the equipment diagnosis method of FIG. 12A.

FIG. 12A is a flowchart illustrating a process of an equipment diagnosis method according to an embodiment, and FIG. 12B is a block diagram conceptually illustrating the equipment diagnosis method of FIG. 12A. The equipment diagnosis method of FIG. 12A may be performed by, for example, the equipment diagnosis system of FIG. 1. The equipment diagnosis method according to an embodiment will be described below with reference to FIGS. 1, 12A, and 12B, and description given above with reference to FIGS. 9 to 11B is omitted.

Referring to FIGS. 12A and 12B, first, the DAQ unit 100 may acquire a plurality of kinds of data of equipment in operation S210. Here, the plurality of kinds of data are as described above with reference to FIG. 9. For example, in the equipment diagnosis method according to the present embodiment, one of the plurality of kinds of data may be torque data which is time series data, and the other data may be text data of the equipment.

Subsequently, in operation S220b, the preprocessing unit 210 may perform a preprocessing process of converting time series data into frequency data including a temporal component. For example, the torque data may be converted into the frequency data including the temporal component by performing preprocessing on the torque data. However, preprocessing may not be performed on the text data. Here, the preprocessing process may be performed through, e.g., an STFT. In FIG. 12B, frequency torque data obtained through preprocessing is in an upper portion and the text data, on which preprocessing is not performed, is in a lower portion.

Subsequently, in operation S242a, the deep learning unit 220 may perform deep learning through a CNN by using the frequency data and may perform deep learning through another learning method by using the text data. Here, the other learning method may be a learning method which differs from the CNN, e.g., a recurrent neural network (RNN), which is mainly used for natural language processing or voice recognition.

Subsequently, in operation S244a, the deep learning unit 220 may merge CNN deep learning data corresponding to the frequency data with deep learning data of the other learning method corresponding to the text data. Here, merging of the CNN deep learning data with the deep learning data of the other learning method may be merging of pieces of data having the same dimension or different dimensions.

In operation S246, the deep learning unit 220 may perform deep learning through a merged CNN by using merged deep learning data. However, a learning method on the merged deep learning data is not limited to the merged CNN. For example, in merged deep learning data obtained through merging of pieces of data having different dimensions, deep learning may be performed through a merged RNN instead of the merged CNN. A deep learning process based on each of the learning methods (S242a) to a deep learning process based on the merged CNN (S246) may be included in a multi-modal deep learning process (S240c).

Subsequently, in operation S250, the diagnosis unit 300 may determine the state of the equipment, e.g., a normal state or a breakdown state, based on multi-modal deep learning.

Figure 13:
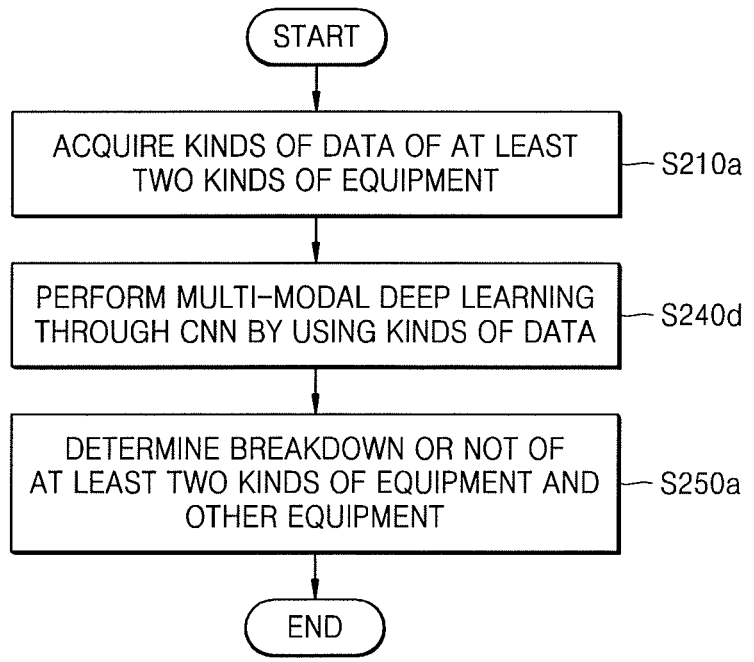
FIG. 13 illustrates a flowchart of a process of an equipment diagnosis method according to an embodiment.

FIG. 13 is a flowchart illustrating a process of an equipment diagnosis method according to an embodiment. The equipment diagnosis method of FIG. 13 may be performed by, for example, the equipment diagnosis system of FIG. 1. The equipment diagnosis method according to the present embodiment will be described below with reference to FIGS. 1 and 13, and description given above with reference to FIGS. 9 to 12B is omitted.

Referring to FIG. 13, first, the DAQ unit 100 may acquire a plurality of kinds of data of at least two kinds of equipment in operation S210a. Here, the at least two kinds of equipment may denote at least two kinds of equipment having different functions. Alternatively, the at least two kinds of equipment may include at least two kinds of equipment which have the same function but are different kinds or different models. Here, the plurality of kinds of data are as described above with reference to FIG. 9. For example, in the equipment diagnosis method of FIG. 9, the plurality of kinds of data may be a plurality of kinds of data acquired from one piece of equipment. On the other hand, in the equipment diagnosis method according to the present embodiment, the plurality of kinds of data may be a plurality of kinds of data acquired from at least two kinds of equipment.

Subsequently, in operation S240d, the deep learning unit 220 may perform multi-modal deep learning through a CNN by using the plurality of kinds of data. Before performing the multi-modal deep learning, some of the plurality of kinds of data may be converted into frequency data including a time series characteristic through preprocessing by the preprocessing unit 210. For example, the preprocessing may be performed through an STFT.

Subsequently, in operation S250a, the diagnosis unit 300 may determine the breakdown or not of the at least two kinds of equipment and other equipment, based on the multi-modal deep learning. Generally, when a diagnosis of one piece of equipment is performed based on deep learning on other equipment, a diagnosis matching rate may be very low. For example, when deep learning is performed on equipment A and then the equipment A is diagnosed, a diagnosis matching rate of 90% or more may be obtained. Also, when such a method is identically applied to equipment B, a diagnosis matching rate of 90% or more may be obtained. However, when the equipment B is diagnosed by using a deep learning result of the equipment A or the equipment A is diagnosed by using a deep learning result of the equipment B, a diagnosis matching rate may be 50% or less, i.e., may be very low. Therefore, deep learning has to be performed on each piece of equipment. Also, when new equipment is introduced, a deep learning result of previous equipment cannot be used, and thus, deep learning has to be performed on the new equipment.

However, as in the equipment diagnosis method according to the present embodiment, deep learning may be integratedly performed on the equipment A and the equipment B, and when each of the equipment A and the equipment B is diagnosed by using an integrated deep learning result, a diagnosis matching rate of each of the equipment A and the equipment B may be enhanced by 90% or more. Also, when new equipment C instead of the equipment A or B is diagnosed by using the integrated deep learning result, a high diagnosis matching rate may be obtained.

That is, in the equipment diagnosis method according to the present embodiment, different pieces of data from different equipment may be merged, and the multi-modal deep learning may be performed based on merged data through a CNN, thereby enhancing a diagnosis matching rate of each of different pieces of equipment and a diagnosis matching rate of new equipment.

As described above, in the equipment diagnosis system and method based on deep learning according to the embodiments, the preprocessing unit may convert time series data, obtained from equipment, into frequency data and may perform preprocessing in order for a temporal component to be included in the frequency data, thereby solving a problem where data size increases and removing the need of detailed interval extraction based on image data. Also, the deep learning unit may perform deep learning through a CNN, based on the frequency data from the preprocessing unit, and thus, may accurately and effectively determine the breakdown or not of the equipment to diagnose the equipment.

Moreover, in the equipment diagnosis system and method based on deep learning according to the embodiments, multi-modal deep learning may be performed based on different types of data through the CNN, thereby enhancing a diagnosis matching rate of equipment. Furthermore, different types of data from different equipment may be merged, and the multi-modal deep learning may be performed based on merged data through the CNN, thereby enhancing a diagnosis matching rate of each of different pieces of equipment and a diagnosis matching rate of new equipment.

Embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the disclosure. Further, the blocks, units and/or modules of the embodiments may be physically combined into more complex blocks, units and/or modules without departing from the scope of the disclosure.

The methods and processes described herein may be performed by code or instructions to be executed by a computer, processor, manager, or controller. Because the algorithms that form the basis of the methods (or operations of the computer, processor, or controller) are described in detail, the code or instructions for implementing the operations of the method embodiments may transform the computer, processor, or controller into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, or controller which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An equipment diagnosis system, comprising:
a data acquisition unit to acquire a first kind of time series data and a second kind of time series data from a first kind of equipment and a second kind of equipment which differs from the first kind of equipment;
a preprocessing unit to convert the first kind of time series data and the second kind of time series data from the first and second kinds of equipment into first frequency data and second frequency data, respectively, each of the first frequency data and the second frequency data including a temporal component, through a Fourier transform;
a deep learning unit to perform deep learning integratedly on the first and second kinds of equipment through a convolution neural network (CNN) by using merged data of the first frequency data and the second frequency data, wherein the CNN includes applying a convolution filter to the first and second frequency data obtained through the Fourier transform to extract a feature map of the first and second frequency data and pooling for reducing a size of the feature map, the applying and the pooling being performed a plurality of times; and
a diagnosis unit to determine respective states of the first and second kinds of equipment to be a normal state or a breakdown state based on an integrated deep learning result from the deep learning using the merged data of the first and second frequency data,
wherein the diagnosis unit is to also determine a state of a third kind of equipment, which differs from the first and second kinds of equipment, using the integrated deep learning result.

2. The equipment diagnosis system as claimed in claim 1, wherein the Fourier transform is one of a fast Fourier transform (FFT), a short time Fourier transform (STFT), and a waterfall FFT.

3. The equipment diagnosis system as claimed in claim 2, wherein
the Fourier transform is the STFT or the waterfall FFT, and
the CNN includes a one-dimensional (1D) CNN where different weight values are respectively assigned to time intervals.

4. The equipment diagnosis system as claimed in claim 2, wherein
the Fourier transform is the STFT, and
the preprocessing unit determines a period of the STFT, based on an operation time of the equipment.

5. The equipment diagnosis system as claimed in claim 1, further comprising a feedback unit to provide a user with a result of diagnosis by the diagnosis unit online or off-line.

6. The equipment diagnosis system as claimed in claim 1, wherein,
before the diagnosis unit determines the state of the equipment, the deep learning unit performs deep learning by using labelled data where a normal state and a breakdown state of the equipment are checked, and
when the diagnosis unit determines the state of the equipment, the deep learning unit performs deep learning by using unlabeled data where a state of the equipment is not checked, and labels the state of the equipment on the unlabeled data based on a result of the deep learning.

7. The equipment diagnosis system as claimed in claim 1, wherein the CNN extracts pieces of the first frequency data and the second frequency data by channels, and performs the applying and the pooling on each of the pieces of the first frequency data and the second frequency data by channels or on mixed data where the pieces of the first frequency data and the second frequency data by channels are mixed.

8. The equipment diagnosis system as claimed in claim 1, wherein the merged data of the first frequency data and the second frequency data used to generate the integrated deep learning result does not include time series data from the third kind of equipment.

9. The equipment diagnosis system as claimed in claim 1, wherein,
when the second kind of equipment is diagnosed by using a deep learning result of only the first kind of equipment, a diagnosis matching rate is 50% or less, and
when the second kind of equipment is diagnosed by using the integrated deep learning result, the diagnosis matching rate is 90% or more.

10. An equipment diagnosis method, comprising:
acquiring a first kind of time series data and a second kind of time series data from a first kind of equipment and a second kind of equipment which differs from the first kind of equipment;
converting the first kind of time series data and the second kind of time series data from the first and second kinds of equipment into first frequency data and second frequency data, respectively, each of the first frequency data and the second frequency data including a temporal component, through a Fourier transform;
deep learning integratedly on the first and second kinds of equipment through a convolution neural network (CNN) using merged data of the first frequency data and the second frequency data, wherein the CNN includes extracting the first frequency data and the second frequency data obtained through the Fourier transform by channels, performing a convolution on the first frequency data and the second frequency data by channels, or on mixed data of the first and second frequency data by channels; and
diagnosing respective states of the first and second kinds of equipment to be a normal state or a breakdown state based on an integrated deep learning result from the deep learning using the merged data of the first and second frequency data,
diagnosing a state of a third kind of equipment, which differs from the first and second kinds of equipment, using the integrated deep learning result.

11. The equipment diagnosis method as claimed in claim 10, wherein,
before diagnosing the state of the equipment, the deep learning includes deep learning using labelled data associated with one of a normal state and a breakdown state of the equipment, and
when the diagnosing determines the state of the equipment, the deep learning further includes deep learning using unlabeled data where the state of the equipment associated therewith is not checked, and
the diagnosing includes labelling the unlabeled data to correspond to the normal state or the breakdown state based on a result of the deep learning.

12. The equipment diagnosis method as claimed in claim 11, wherein the deep learning includes labelling data after determining the state of the equipment associated with the data, and using labelled data for deep learning.

13. The equipment diagnosis method as claimed in claim 10, wherein
the Fourier transform is a short time Fourier transform (STFT) or a waterfall fast Fourier transform (FFT), the CNN includes a one-dimensional (1D) CNN where a weight value is assigned to each of time intervals, and the 1D CNN uses a plurality of 1D filters.

14. The equipment diagnosis method as claimed in claim 13, wherein
the Fourier transform is the STFT, and
the converting includes determining a period of the STFT based on an operation time of the equipment.

15. The equipment diagnosis method as claimed in claim 10, further comprising, after the diagnosing, providing a user with a result of diagnosis online or off-line.

16. An equipment diagnosis method, comprising:
acquiring a plurality of kinds of data from a first kind of equipment and a second kind of equipment which differs from the first kind of equipment, wherein the plurality of kinds of data include at least two kinds of time series data;
multi-modal deep learning integratedly on the first and second kinds of equipment through a convolution neural network (CNN) by using the plurality of kinds of data from the first and second kinds of equipment; and
diagnosing a state of the first and second kinds of equipment to be a normal state or a breakdown state based on an integrated deep learning result from the multi-modal deep learning,
wherein the equipment diagnosis method further comprises, before the multi-modal deep learning:
converting the at least two kinds of time series data into at least two kinds of frequency data through a Fourier transform; and
merging the at least two kinds of frequency data obtained through the Fourier transform, and corresponding to the first and second kinds of equipment, to produce merged frequency data, and
wherein the integrated multi-modal deep learning uses the merged frequency data.

* * * * *